United States Patent
Watanabe et al.

(10) Patent No.: US 9,542,969 B2
(45) Date of Patent: Jan. 10, 2017

(54) OPTICAL RECORDING MEDIUM AND OPTICAL INFORMATION PLAYBACK METHOD

(75) Inventors: Takao Watanabe, Tokyo (JP); Manabu Shiozawa, Tokyo (JP); Koichi Watanabe, Tokyo (JP); Shigeharu Kimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/403,460

(22) PCT Filed: May 28, 2012

(86) PCT No.: PCT/JP2012/003453
§ 371 (c)(1),
(2), (4) Date: Nov. 24, 2014

(87) PCT Pub. No.: WO2013/179329
PCT Pub. Date: Dec. 5, 2013

(65) Prior Publication Data
US 2015/0302883 A1    Oct. 22, 2015

(51) Int. Cl.
*G11B 7/013* (2006.01)
*G11B 7/005* (2006.01)
*G11B 7/00* (2006.01)

(52) U.S. Cl.
CPC .............. *G11B 7/013* (2013.01); *G11B 7/005* (2013.01); *G11B 2007/0009* (2013.01); *G11B 2007/0013* (2013.01)

(58) Field of Classification Search
CPC ..... G11B 3/38; G11B 3/74; G11B 2005/0002; G11B 7/00456; G11B 11/10597; G11B 2007/0009; G11B 2020/1227; G11B 20/10; G11B 20/10009; G11B 20/1496; G11B 27/19; G11B 5/314; G11B 5/70626; G11B 5/716; G11B 7/00455; G11B 7/00552; G11B 7/007

See application file for complete search history.

(56) References Cited

U.S. PATENT DOCUMENTS 4,612,587 A * 9/1986 Kaneko ............... G02F 3/00
                                                          360/59
5,694,249 A   12/1997 Misawa
(Continued)

FOREIGN PATENT DOCUMENTS

| JP | 03-295040 A | 12/1991 |
| JP | 08-220688 A | 8/1996 |

(Continued)

OTHER PUBLICATIONS

Glezer et al., "Three-dimensional optical storage inside transparent materials", Optics Letters, Dec. 15, 1996, pp. 2023-2025, vol. 21, No. 24.

(Continued)

*Primary Examiner* — Dionne H Pendleton
(74) *Attorney, Agent, or Firm* — Mattingly & Malur, PC

(57) ABSTRACT

When a simple magnification optical system is used in reproduction of a recording medium in which a large number of minute modified regions are three-dimensionally formed inside solid matter, contrast is insufficient and interlayer crosstalk is increased, and therefore, it is impossible to take a sufficient S/N ratio. Provided is a recording medium in which at least one layer is configured by a set of two adjacent sub-layers, and dots on a sub-layer correspond to a recording data '1' and dots on the other sub-layer correspond to '0'. These data are played back.

13 Claims, 11 Drawing Sheets

(56) References Cited

U.S. PATENT DOCUMENTS

| | | | |
|---|---|---|---|
| 5,761,111 A | 6/1998 | Glezer | |
| 6,266,299 B1* | 7/2001 | Oshima | G06T 1/0021 |
| | | | 369/13.38 |
| 6,729,161 B1 | 5/2004 | Miura et al. | |
| 7,688,685 B1* | 3/2010 | Nemoto | G11B 11/10502 |
| | | | 369/13.26 |
| 2002/0181352 A1 | 12/2002 | Saimi et al. | |
| 2004/0124343 A1 | 7/2004 | Shimotsuma et al. | |
| 2006/0182000 A1* | 8/2006 | McNiece | G02B 5/1876 |
| | | | 369/112.1 |
| 2010/0097916 A1 | 4/2010 | Horinouchi et al. | |

FOREIGN PATENT DOCUMENTS

| | | |
|---|---|---|
| JP | 2782910 B2 | 5/1998 |
| JP | 11-197498 A | 7/1999 |
| JP | 2000-293947 A | 10/2000 |
| JP | 2003-51129 A | 2/2003 |
| JP | 2004-310009 A | 11/2004 |
| JP | 2004-342204 A | 12/2004 |

OTHER PUBLICATIONS

Sakakura et al., "Improved phase hologram design for generating symmetric light spots and its application for laser writing of waveguides", Optics Letters, Apr. 1, 2011, pp. 1065-1067, vol. 36, No. 7.

Japanese Office Action received in corresponding Japanese Application No. 2014-518076 dated Dec. 15, 2015.

Japanese Office Action received in corresponding Japanese Application No. 2014-518076 dated Mar. 29, 2016.

* cited by examiner k=1,2,...

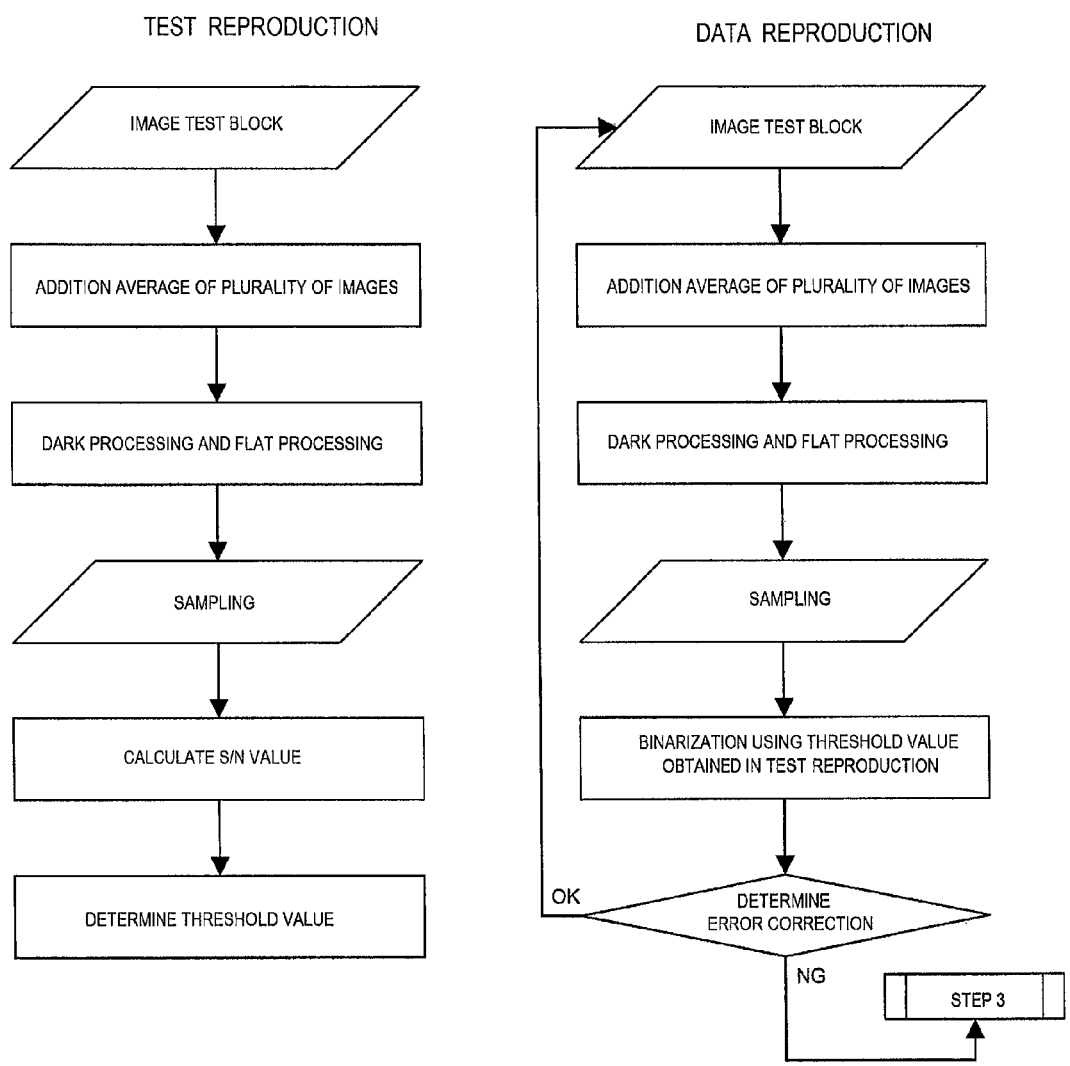

OPTICAL RECORDING MEDIUM AND OPTICAL INFORMATION PLAYBACK METHOD

TECHNICAL FIELD

The present invention relates to an information recording medium and a method of reproducing data recorded in the medium.

BACKGROUND ART

It has been known that minute modified regions which have a different refractive index from that of the vicinity thereof are formed when a short pulse laser is condensed on the inside of a transparent medium such as silica glass. It has been discovered that a large number of the minute modified regions are three-dimensionally formed inside the medium to be used for recording information.

The following PTLs 1 and 2 and NPL 1 are literature relating to such a recording medium. A mechanism in which local modification is caused by the short pulse laser is, for example, disclosed in NPL 2.

CITATION LIST

Patent Literature

PTL 1: JP-A-8-220688
PTL 2: U.S. Pat. No. 576,111
PTL 3: JP-A-2004-310009
PTL 4: JP-A-11-197498

Non Patent Literature

NPL 1: E. N. Glezer, et. al, "Three-dimensional optical storage inside transparent materials", Opt. Lett., Vol. 21, No. 24, pp. 2023-2025 (1996)

NPL 2: M. Sakakura, et. al, "Improved phase hologram design for generating symmetric light spots and its application for laser writing of waveguides", Opt. Lett., Vol. 36, No. 7, pp. 1065-1067 (2011)

SUMMARY OF INVENTION

Technical Problem

The recording medium disclosed in the above-described PTLs 1 and 2 and NPL 1 is a recording medium that records data in a stable and homogeneous material such as glass. For this reason, it is considered that there is an advantage in that the recording medium is excellent in durability and is particularly suitable for storing data over a long period of time.

However, in order to reproduce data, such as actual text, sound, or image data, having a large recording capacity, it is necessary to sufficiently increase the S/N ratio, that is, the ratio of a signal to noise during reproduction. No examination in this respect has been previously done.

Solution to Problem

A representative overview of the invention disclosed in the present application will be simply described as follows.

In an optical recording medium in which a large number of minute modified regions are three-dimensionally formed inside solid matter, the above-described minute modified regions (hereinafter, denoted as dots) are formed on an n layer (where n is an integer greater than or equal to 1) on a parallel plane, at least one layer (denoted as i layer) is configured by a set of two adjacent sub-layers LAi and LBi, dots on any one layer thereof correspond to data '1' to be recorded, and dots on the other layer thereof correspond to '0'.

As a result, when observed from a normal line direction of the above-described plane, there is no overlap between dot positions on sub-layers LAi and LBi. Moreover, when both of the sub-layers are combined, the dots appear to be two-dimensionally arranged in a constant period without any gaps.

Advantageous Effects of Invention

It is possible to take the difference between recorded signals '0' and '1' by taking the difference between the signals obtained from the above-described sub-layers LAi and LBi. For this reason, the S/N ratio becomes large compared to a case in which only any one of '0' and '1' is recorded as a dot.

It is possible to increase the S/N ratio while reproducing data by providing the sub-layers LAi and LBi as described above.

BRIEF DESCRIPTION OF DRAWINGS

FIG. 11 is an example of a sequence of data reproduction using FIG. 10.

DESCRIPTION OF EMBODIMENTS

Example 1

Hereinafter, an embodiment of the present invention will be described in detail based on the drawings.

Figure 1:
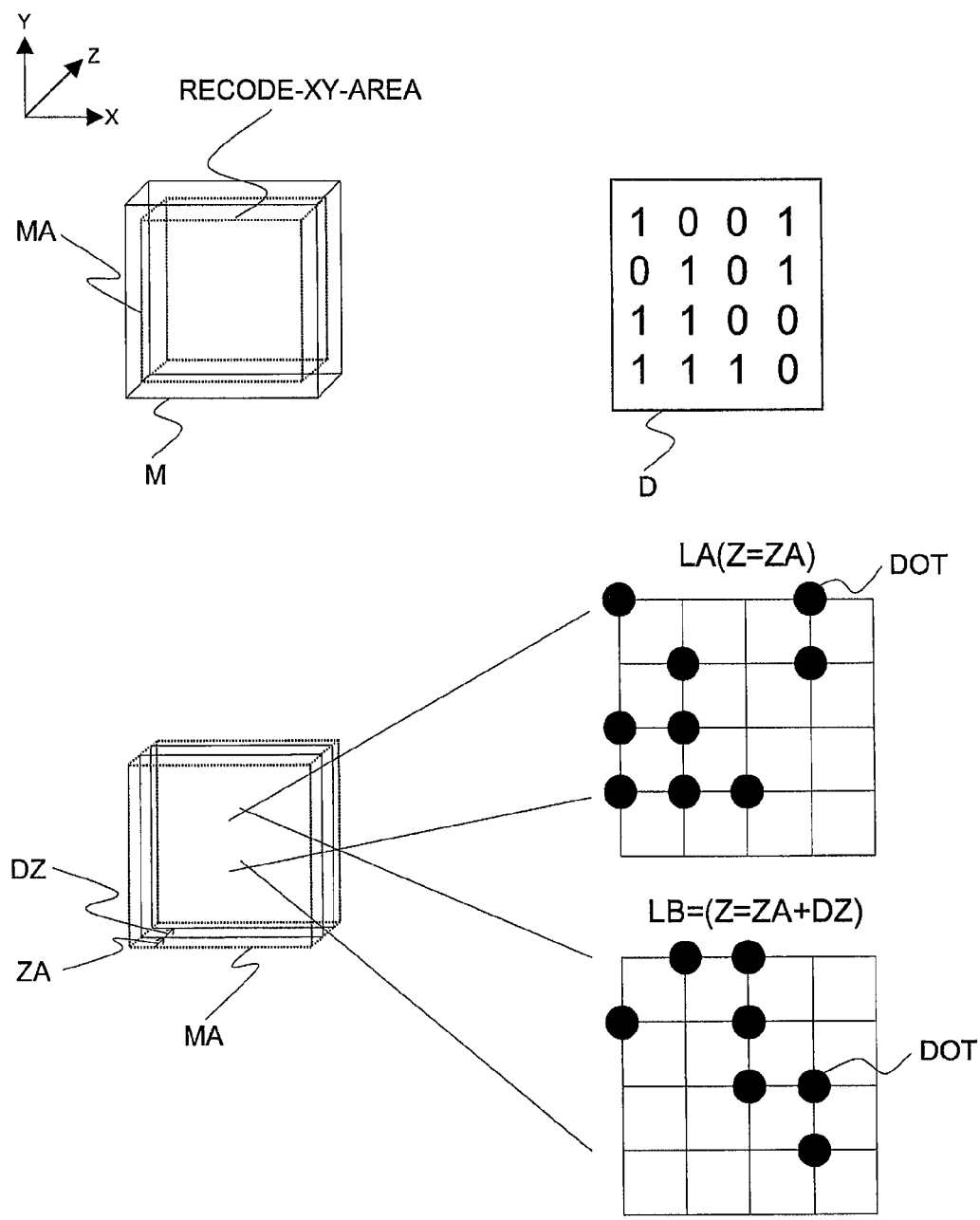
FIG. 1 is an example relating to an arrangement of minute modified regions in a recording medium.

FIG. 1 is an example of a recording medium according to the present invention. In the present example, a recording medium M is a plate-like transparent medium of which the quality is glass such as silica glass, or plastic, alumina, or the like. Hereinafter, an XY axis and a Z axis shown in the drawing will be defined based on a corner of a medium for convenience. Z shows a coordinate on a plane in a thickness direction of a medium and XY shows a coordinate on a plane orthogonal thereto.

A large number of minute modified regions (dots) DOT are discretely formed in the recording medium M. The dots DOT are formed by condensing laser light on the inside of the recording medium M and have different optical characteristics, such as a refractive index, from those of the vicinity of the medium. Local modification due to condensing of a short pulse laser can be expressed not only as the difference in refractive indexes between the dots and the vicinity, but also as polarization characteristics or light emission characteristics as disclosed in PTLs 3 and 4.

The above-described dots form a set of sub-layers including LA and LB, and each layer is formed on an XY plane, that is, on a plane on which a Z coordinate is a substantially constant value. Hereinafter, the distance between the above-described sub-layers in a Z direction is denoted as DZ. Here, the Z coordinate on the LA layer is defined as ZA. For this reason, the Z coordinate on the LB layer becomes ZA+DZ. Hereinafter, each pitch of the dots within the LA layer and the LB layer is marked as DX in an X direction and as DY in a Y direction.

Recording regions of dots on the LA layer and the LB layer can extend to near an end of the XY plane within the recording medium M. In FIG. 1, dots are recorded using a dotted line area RECODE-XY-AREA. Although not shown in the drawing, the LA layer and the LB layer are formed of one or a plurality of blocks in which dots are two-dimensionally arranged.

The size of a block and the number of blocks may be appropriately determined, and can be freely determined in consideration of the size of a medium in an XY direction, the minimum gap between dots, or the size of a dot which can be recorded or played back at a time, for example, an arrangement of 32×32 blocks lengthwise and crosswise which have 32×32 dots or 128×256 dots. In the drawing, description will be made by assuming that the block is small having 4×4 dots for easy understanding of the principle.

In addition, the black spots in the drawing represent dots and the lattice-like lines are auxiliary lines for facilitating understanding. Data are expressed by recording or not recording dots at the intersections. The dot arrangement of the LA layer is obtained by recording a data array of '1' in a data matrix D shown in FIG. 1 and the dot arrangement of the LB layer is obtained by recording an array of '0' in the data matrix D.

Accordingly, an XY coordinate of dots on each layer is determined by an arrangement of '1' and '0' in the data matrix D to be recorded. As can be easily seen from FIG. 1, when combining both of the dot arrays on one XY plane, dots are arranged in a lattice shape with a gap DX in the X direction and with a gap DY in the Y direction.

The bit density within the XY plane when the LA layer and the LB layer are combined becomes $1/(DX \cdot DY)$. For this reason, the dot density in the surface reaches a maximum value when DX and DY are made equal as long as there is no particular difference in minimum processing pitches of the dots in the X direction and the Y direction. The value becomes $1/F^2$ when the minimum processing pitch of the dots is set to F.

The data recorded in the medium of the present example are data in which both information pieces of data matrixes 1 and 0 are physically recorded. A specific example of the reproduction method will be described later, but it is possible to obtain a high S/N ratio by taking the difference between a signal, which is obtained from dots on the LA layer obtained by recording the information of '1', and a signal, which is obtained from dots on the LB layer obtained by recording the information of '0', by irradiating the medium M with light.

In addition, the dot arrangements on the LA layer and the LB layer have different XY coordinates from each other as described above. For this reason, it is possible to suppress generation of crosstalk noise between the sub-layers including the LA layer and the LB layer by setting an appropriate value of the interlayer distance DZ with respect to the dot distances DX and DY within the layers.

Although the dot arrangements on the LA layer and the LB layer are considered not to be overlapping in the Z direction, the interlayer distance DZ is made large with respect to the minimum distances DX and DY between dots within the layers to reduce influence on any one layer when focusing on the other layer. However, it is easy to correct the aberration if DZ is short in consideration of easy correction of the aberration during recording. A lower limit value of DZ is provided in consideration of reproduction. The lower limit value of DZ becomes a focal depth of an objective lens used for reproduction. This is because an image of one layer is blurred when focusing on the other layer.

In contrast, it is necessary that DX and DY be longer than the resolving power of the objective lens used for reproduction. The focal depth is inversely proportional to the square of a numerical aperture NA of a lens and the resolving power is inversely proportional to NA. That is, the focal depth is 1/NA of the resolving power. Accordingly, the lower limit value of the interlayer distance DZ is 1/NA of the minimum dot distances DX and DY in the layers. NA is less than or equal to 1 in a general objective lens which is not an immersion type. Therefore, the lower limit of the interlayer distance DZ between the pair of layers becomes the minimum dot distance DX or DY in the layers. However, this merely regards the lower limit, and making DZ longer including more margins is practically safe in consideration of the variation in gaps between dots.

As will be described later, there is a focus position (hereinafter, denoted as an FB position) at which the dot portion appears to be darker (black) compared to the vicinity which has become bright due to transmissive light, and a focus position (hereinafter, denoted as an FW position) at which the dots appear to be brighter (white) compared to the vicinity. The dots appear to be black or white at the FB position and the FW position. Therefore, when DZ is set to have substantially the same difference as that between FB and FW, dots on one layer of the pair of layers appear to be dark and dots on the other layer appear to be bright at a substantially identical focal position, and thus, effort for performing individual focusing is saved, which is advantageous.

The variation in positions within the layers of the dots on the LA layer and the LB layer will be described. As described above, the dots are arranged in the lattice shape when the image on the LA layer and the image on the LB layer are combined. Large variation in the positions of the dots is not desirable as the dots overlap each other in such a state. As a reference, in the above-described combined image, it is desirable that standard deviation of dot pitches be less than or equal to ⅓ compared to the average value of the dot pitches.

As described above, according to the present example, it is possible to reproduce data, which is recorded in a transparent material such as glass, plastic, or alumina, at a high S/N ratio.

Accordingly, it is possible to store text, sound, or image information over a long period of time and to reproduce the same, for example.

In addition, it is possible to convert information to be recorded into a so-called two-dimensional bar code and to apply the two-dimensional bar code to the present example. In this case, the information to be recorded may be divided into a plurality of sets of data and the sets may be converted into the two-dimensional bar code. In a general two-dimensional bar code, one-layer data is printed on paper or the like. However, according to the present example, it is possible to reduce the pitch between the dots compared to the printing done on the paper and to realize higher recording density.

It is possible to apply the two-dimensional bar code even when the printing is multilayered as an example to be described later, and in this case, it is possible to perform large-capacity recording.

Several standards of the two-dimensional bar code are known. In general, position detecting marks are defined so that the position of data is easily detected even if the image is greatly rotated in a plane, and a strong error correction function is provided. Therefore, when the two-dimensional bar code is applied to the present example, it is possible to more easily reproduce data in the optical system, which is advantageous.

In order to apply the two-dimensional bar code to the present example, the two-dimensional bar code may be recorded in an LA layer and the inversion information thereof may be recorded in an LB layer. In this case, the position detecting marks can be simply detected, and therefore, it is possible to record only a data portion in the LA layer and the LB layer by recording in any one layer. By doing this, it is possible to reduce the time required for recording.

In general, a region larger than a physical bit is used for the position detecting marks. Also in the present invention, it is possible to record large position detecting marks if the recording is performed on a bitmap using a plurality of dots. For this reason, according to the present invention, it is possible to deal with position detecting marks of a two-dimensional bar code having various standards.

It is possible to extend the example in FIG. 1 to have a larger number of layers or to make the dots be arrayed in a shape other than the lattice shape. Such an example will be described later. Hereinafter, the reproduction method of data will be described taking the example in FIG. 1 as an example, using examples shown in FIGS. 2 and 3.

Figure 2:
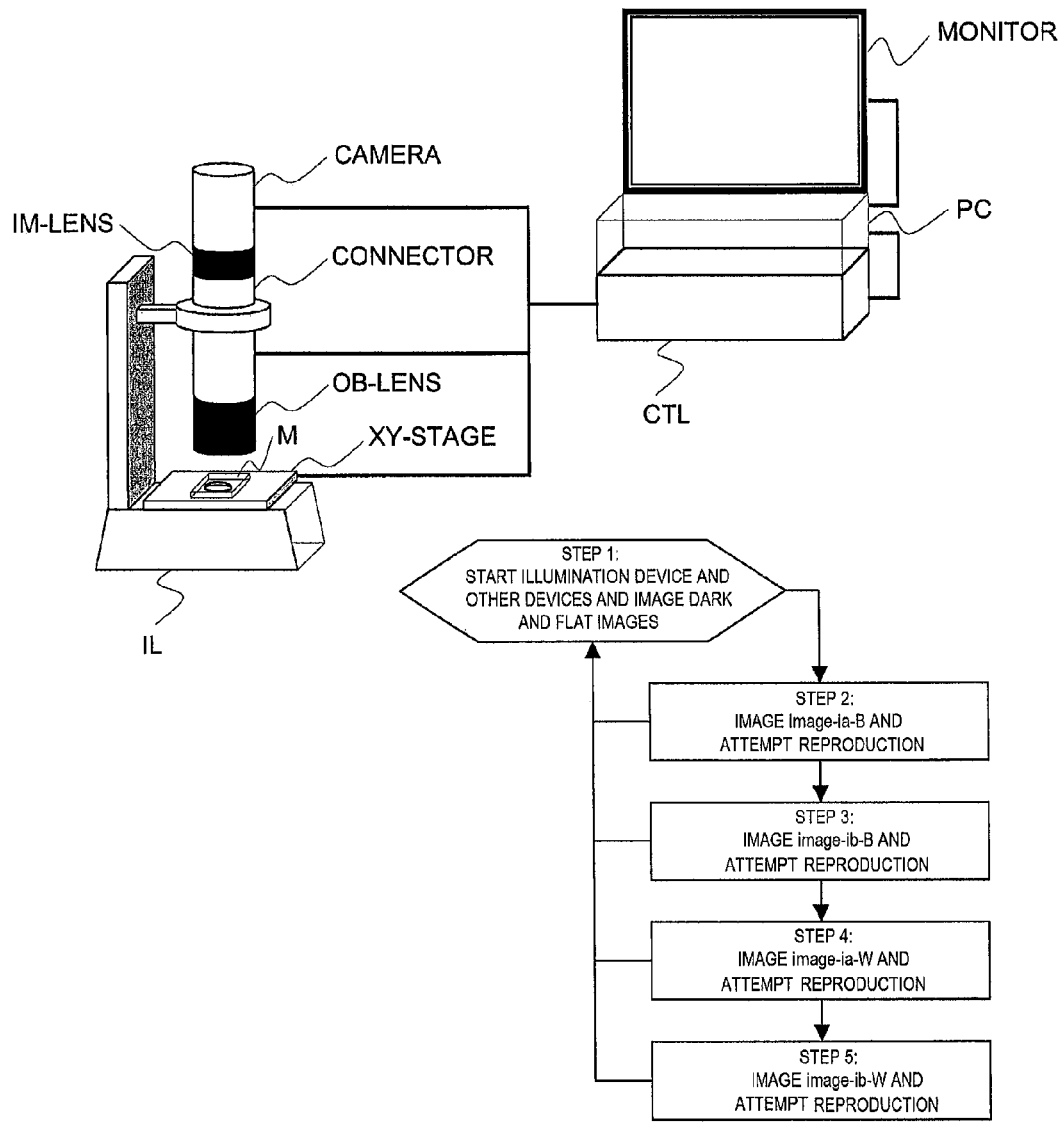
FIG. 2 is an example showing other configurations of an optical system of a reproduction method.

FIG. 2 is an example showing a basic configuration of a reproduction device for reproducing data using the present invention. In the present specification (not limited to FIG. 2), a lens in a group is shown in each drawing in order to simply show a configuration of an optical system in principle. However, needless to say, the aberration of the optical system is corrected as necessary by having a configuration of a plurality of lenses in a plurality of groups as an actual device.

In addition, an example using transmissive illumination is shown in FIG. 2, but it is also possible to use a so-called epi-illumination in which light is illuminated from an objective lens side. In this case, reflected light is imaged, and therefore, there is a possibility that crosstalk is increased when there are multilayered lenses included. However, there is an advantage in that only one surface on the objective lens side among the surfaces of the medium is precisely polished into a plane and in that it is not necessary to precisely polish both of the surfaces. In FIG. 2, IL is an illumination device configured of a light source and an optical system, and XY-STAGE indicates an XY-stage, OB-LENZ indicates an objective lens, IM-LENS indicates an imaging lens, CONNECTOR indicates a connection tube incorporating a focus adjustment mechanism, and CAMERA indicates a camera incorporating a two-dimensional imaging element.

As will be described later, CAMERA (camera) can also be set to a scanner incorporating a one-dimensional optical sensor. In addition, MONITOR is a display device showing an image which is photographed using the camera CAMERA. PC is a computer which controls a controller CTL to be described later and displays an image signal from the camera on a monitor, using installed software. In addition, PC also has a function of performing image processing by recording a plurality of images, which are photographed using the camera, in a memory therein; a function of reproducing data which have been recorded from the processed image data; a function of storing the processed images or reproduction data; and the like.

CTL is a controller which has a function of adjusting the focus of a lens by moving the objective lens OB in the Z direction by controlling the connection tube incorporating the focus adjustment mechanism; a function of changing the brightness of illumination; a function of operating the XY-stage XY-STAGE and moving the recording medium on the XY-stage within an photographing range of the camera to change the imaging region; and the like.

The camera CAMERA is a so-called digital camera which includes an imaging element IM-CHIP (not shown) having pixels including m pixels in the X direction and n pixels in the Y direction therein. The camera CAMERA can be set to a scanner incorporating a one-dimensional optical sensor.

The imaging lens IM-LENS is provided by being separated from the above-described imaging element by approximately a focal distance f-IM of the imaging lens. A focused plane is provided at a position separated from the objective lens OB-LENS by approximately a focal distance f-OB of the objective lens.

In principle, the above-described configuration is the same optical system as that of an infinity correction type microscope provided with a camera. Thus, hereinafter, the description of well-known points of the microscope will be omitted and important items in reproducing data of the recording medium in the present invention will be intensively described.

In reproducing data, illumination IL is lit, the recording medium M is placed on the above-described XY-stage XY-STAGE and appropriately moved in the XY direction, and then, the objective lens is focused on the vicinity of the layer LA inside the medium to slightly move the focus forward and backward. By doing this, it can be seen that there is a focus position (FB position) at which the dot portion appears to be darker (black) compared to the vicinity which has become bright due to transmissive light, and a focus position (FW position) at which the dots appear to be brighter (white) compared to the vicinity. As a matter of course, it is possible to focus the lens while checking the image with the naked eye in order to detect these positions. However, the average brightness of the image and a primary differential (difference between adjacent pixels) of the image may be calculated in real time while automatically changing the focus little by little in order to increase efficiency. The brightness increases when the dots appear to be white and decreases when the dots appear to be black. In addition, it is possible to detect a focus position at which the dot image appears to be sharp when the edge is detected using a differential image.

As described above, it is possible to automatically search the FB position and the FW position by detecting the brightness and the edge. However, in some cases, the two above-described positions vary depending on the location of a visual field of a read-out optical system due to the aberration in a recording optical system or a reproduction optical system. In such a case, it is possible to perform automatic detection the same as that in the case in which the aberration does not cause a problem by recording a plurality of images obtained by gradually changing the focus, by dividing the visual field into a plurality of regions and performing the detection of the brightness or the edge for each divided portion, and by combining the divided regions, which match the condition, as one image.

It is considered that the difference between the FB position and the FW position in the Z direction varies depending on the recording condition or the reproduction condition, and the optical system. In an example of a trial sample of the invention, the FB position was placed at a position at which the objective lens was separated from the illumination by 10 µm compared to the FW position. The medium at this time was silica glass and the objective lens used for observation had 20 times magnification. It is considered that the numerical aperture is about 0.6, while there is no indication thereof. The length of dots in the Z direction is about 30 µm and the dot pitch within a layer is 2.8 µm. Among these, an image of a dot pattern on the LA layer is imaged at the FB position, that is, a focus position at which the dots appear to be dark, and the image data are stored in a memory inside the computer PC.

Hereinafter, an image which is obtained by imaging an LX layer (X is a or b) at the FB position is denoted as image-iX-B and an image which is obtained by imaging the LX layer at the FW position is denoted as image-iX-W. Consequently, similarly in an LB layer, an image (image-ib-B) is imaged at the FB position, that is, a focus position at which dots appear to be dark, and the image data are stored in a memory inside the computer PC.

Next, image data (image-sub) which is obtained by subtracting a pixel value of image-ib-B from each pixel value of the image of image-ia-B is created.

When subtracting or adding two images, in some cases, the positions of dots corresponding to both the images are deviated due to an optical or mechanical reason. In such a case, as a matter of course, the subtraction or addition is performed after performing alignment of both the images. In particular, in the images at the above-described FB position and FW position, in some cases, the positions of dots are slightly deviated since a transfer function of the optical system is changed by changing the focus position. In this case, it is possible to simply perform the detection of the deviation amount of the positions using any one image of which the shade is reversed. Alternately, as will be described layer in the example of FIG. 10, it is possible to reduce the influence of the above-described positional deviation by performing the subtraction or the addition after sampling data from the image in advance, using the alignment marks provided in each image. When performing the subtraction at this time, as a matter of course, the images may be subtracted by multiplying image-ib-B by an appropriate coefficient.

Hereinafter, when subtraction processing or addition processing of an image is mentioned in the present specification, subtraction or addition, which is performed by multiplying an appropriate coefficient, is included therein. When it is possible to make pixels in which a shading value becomes a negative value through the subtraction, the value is controlled so as not to exceed the dynamic range of an image format by appropriately performing bias or gradation compression on all of the images. When image-sub is displayed as an image, the location of the dots on the LB layer appears to be brighter (white) and the location of the dots on the LA layer appears to be darker (black), compared to the surrounding portion in which there is no dot. Accordingly, it is possible to reproduce the recorded data when a pixel value at a position of minute modified regions (dots) of image-sub and an average value of shades in a portion in which there is no dot are set to threshold values and are binarized into '0' and '1'.

The data which are imaged at the FB position, that is, a focus position at which the dots appear to be dark are used in the above description. However, as can be easily understood, it is possible to perform the same reproduction using the images at the FW position. In addition, it is natural that it is possible to perform the same reproduction even through a method of selectively using any one of an image at the FB position and an image at the FW position depending on layers such as an is layer and an ib layer.

In the present example, both original data '0' and '1' are recorded as dots, and therefore, both the data '0' and '1' have a signal (shading difference with a portion in which there is no dot). Accordingly, it is possible to obtain a high S/N ratio compared to the case in which dots are normally formed in a portion corresponding to any one of the original data '0' and '1'.

In addition, in the present example, dots are observed from all positions when the dots on the above-described sub-layers LAi and LBi are combined. For this reason, crosstalk noise, which is generated in the LAi and LAi layers when reproducing information recorded in a separate layer, is substantially uniform in the period of a pitch between dots in a front surface of a recording region. Therefore, the noise from the two layers is offset when reproducing the information of another layer.

The S/N ratio may be made larger after taking the difference between the FB position and the FW position. That is, an image image-ia-B-W, which is obtained by subtracting each pixel value of an image image-ia-W of ia at the FW position from each pixel value of an image image-ia-B of ia at the FB position, is created as an image on the LA layer, and similarly, an image image-ib-B-W, which is obtained by subtracting the image at the FW position from the image of the FB position, is prepared as an image on the LB layer. In the images on the LA layer and the LB layer which are created in this manner, the shading difference between the dots and a portion in which there is no dot becomes great compared to the case in which an image is created from a single focus position, thereby increasing the S/N ratio. Accordingly, it is possible to reproduce data at a higher S/N ratio if image data (image-sub) of the difference is created from these positions similarly to above.

The above-described effect also depends on the recording condition of dots or the characteristics of the reproduction optical system. An improvement in the S/N ratio exceeding 1 dB can be seen in the trial sample in the invention. In some cases, the XY positions of the dots in the image obtained from the FB position and in the image obtained from the FW position are slightly deviated. In such a case, it is possible to further increase the S/N ratio when the positions are corrected such that the difference between the dot positions becomes small before taking the difference.

In addition, in the example of FIG. 1, the XY coordinate of the dot arrangement on the LA layer and the XY coordinate of the dot arrangement described above on the LB layer are different from each other as described above. Therefore, it is possible to reduce the influence of a blurred image of dots on one layer with respect to an image of dots on the other layer which is focused on, by appropriately setting the interlayer distance DZ with respect to dot distances DX and DY within the layers. At this time, when any one of the gaps DZ between the LA layer and the LB layer is set to the above-described FB position and the other one is set to the FW position, it is possible to obtain an image having a large signal amount, that is, a large brightness and darkness difference between both of the positions at one focus position at a time. Therefore, it is possible to increase the efficiency of the imaging.

Through image processing performed by the computer PC of a reproduction device of the present example, it is also possible to increase the S/N ratio of the image imaged before the above-described processing in advance. For example, when heat noise of the camera causes a problem, a so-called dark processing is effective in which a noise image is imaged at the same temperature and the same exposure time as those at the time of imaging in a state where a shutter is closed, and the imaged noise image is subtracted from the imaged image. In this case, it is possible to more reliably remove the dark noise when a cooling CCD camera or the like which has a function of constantly maintaining the temperature of the imaging element is used.

In addition, in a case in which illumination unevenness, peripheral darkening of the optical system, or the like causes a problem, a so-called flat processing is effective in which a location where dots are not recorded is imaged and a dot image is divided by the imaged image. It is possible to further reduce the noise by imaging a plurality of images of the above-described dots, images of the dark noise, or images for the flat processing and by taking an addition average thereof.

Furthermore, it is also possible to improve the S/N ratio by performing image processing. For example, when the length of the dots in the Z direction is longer than the focal depth of the objective lens, a focused image overlaps a blurred image in the other portion. Improvement in the so-called blurred image through image processing using a spatial filter, a frequency filter, or the like in advance is significantly effective in improvement of the S/N ratio. Examples of the processing improving in the blurred image include a Wiener filter, a maximum entropy method, a sharp filter, a highpass filter which performs inverse conversion by performing Fourier transformation and by reducing a low frequency component. These may be applied depending on the processing time or a descent. For example, a one-layer sample having 2.8 μm of a dot pitch within a layer and 30 μm as a length of the dots was produced as a trial, and a filter, which is called an unsharp filter and is effective in improving the blurred image, was applied. As a result, the S/N ratio was improved by a maximum of 8 dB.

In the above description, a relationship between the gap between dots, the distance between pixels of an imaging element, and the magnification of the optical system; a recording region which can be photographed at a time; and the like will be described. First, the size of a region of a medium which can be photographed at a time has a dimension in which the size of the imaging element is divided by an optical magnification. For example, when the optical magnification is 5 times, the longitudinal and horizontal dimensions of the region which can be imaged at a time becomes a fifth of each dimension of the imaging element.

In contrast, if the minimum gap between dots on a layer inside a medium is not set to be twice as large as the gap between the pixels of the imaging element or greater, it is difficult to separate the closest dots based on the sampling theorem. For example, when the distance of the closest dots within a layer and a distance between the pixels are the same as each other, it is necessary that the optical magnification be doubled at minimum. However, in fact, in a case where there is an influence of an aberration of the optical system, an influence of blur due to a spherical aberration caused by the thickness of a medium, and an influence of a low pass filter which is arranged immediately before the imaging element, and in a case where a color imaging element is used as an imaging element, in general, 4 pixels are set to be one pixel. Therefore, it is necessary to increase the magnification to that extent.

It is necessary to determine an appropriate value for the optical magnification such that, for example, the minimum gap between the dots in an image on an imaging element becomes greater than or equal to 4 pixels of the imaging element, in consideration of the above. Needless to say, it is necessary to use an objective lens having NA which can analyze the distance of the closest dots within a layer. It can be considered that, in some cases, the fact that the region which can be imaged becomes a very small portion of a recording region when the magnification is set to a required magnification, and the number of sheets of media for imaging the entire image increases causes a problem. In this case, use of a two-dimensional imaging element which has a large area is effective, but the manufacturing cost increases. Therefore, it is possible to use a scanner incorporating a one-dimensional optical sensor. There is an advantage in using the one-dimensional optical sensor in terms of lower cost when imaging a large area.

In addition, the following method may be used in addition to the large two-dimensional element or the large one-dimensional optical sensor. The method is a method of imaging a plurality of images which are then combined into one image by deviating the imaging element or the optical sensor by a fraction of the number of pixel sizes when imaging an image using the two-dimensional imaging element or the one-dimensional optical sensor. For example, when an image is photographed by moving the imaging element or the optical sensor half by half of the pixel pitch, the same effect as that in a case where the original pixel pitch is halved is obtained, and it is possible to obtain an identical resolution at a halved magnification. In this case, it is natural that the sample which is an object may also be moved instead of the imaging element or the optical sensor.

Finally, an example of a sequence of reproduction of data recorded in the medium of FIG. 1 will be described using the flowchart described on the right side of FIG. 2. First, photographing preparation is performed in Step 1. That is, after setting a sample by lighting illumination, necessary images for the above-described dark processing or flat processing are acquired and stored in the memory inside the computer PC. An image of only heat noise is acquired such that light is prevented from being incident on the lens in order to perform the dark processing. A portion, in which dots of the sample are not recorded, for example, an image in a region close to an end, may be photographed for the image for the flat processing.

For example, in a case where a camera having no cooling function is used, in some cases, when photographing is performed in advance, the image required for the dark processing has different noise from that at a temperature at the time of photographing a dot image. In such a case, imaging may be performed while photographing the dot image as necessary. As a matter of course, any one or both of the dark processing and the flat processing may be omitted as necessary depending on the performance of a camera.

Next, in Step 2, image-ia-B in a dot portion of the sample is imaged by moving the XY-stage. The image of image-ia-B is acquired by checking the edge component and the brightness and darkness of the image as described above while moving the focus of the objective lens in the Z direction. The acquired image is stored in a memory inside the computer PC. It is possible to implement discrimination between the LA layer and the LB layer from coordinate values of the objective lens in the Z direction. Reproduction of data is attempted through image processing using PC for the acquired image. At this time, if it is possible to perform the desired reproduction, the XY-stage is moved and reproduction processing in another block region starts from Step 1. If it is impossible to perform desired reproduction, the process proceeds to Step 3.

In Step 3, image-ib-B in a dot portion of the sample is imaged without moving the XY-stage. The acquired image is stored in a memory inside the computer PC. Difference images between image-ia-B and image-ib-B are calculated through image processing using PC and are stored in the memory, and reproduction of data is attempted using this. At this time, if it is possible to perform the desired reproduction, the XY-stage is moved and reproduction processing in another block region starts from Step 1. If it is impossible to perform the desired reproduction, the process proceeds to Step 4.

In Step 4, image-ia-W in a dot portion of the sample is imaged without moving the XY-stage. The acquired image is stored in a memory inside the computer PC. Difference images between image-ia-B and image-ia-W are calculated using PC and are stored in the memory, and reproduction of data is attempted using this. At this time, if it is possible to perform desired reproduction, the XY-stage is moved and reproduction processing in another block region starts from Step 1. If it is impossible to perform desired reproduction, the difference with image-ib-B which is stored in the memory is taken to attempt the reproduction. At this time, if it is possible to perform the desired reproduction, the XY-stage is moved and reproduction processing in another block region starts from Step 1. If it is impossible to perform the desired reproduction, the process proceeds to Step 5.

In Step 5, image-ib-W in a dot portion of the sample is imaged without moving the XY-stage. The acquired image is stored in a memory inside the computer PC. Difference images between image-ib-B and image-ib-W are calculated using PC and are stored in the memory, and reproduction of data is attempted using this. At this time, if it is possible to perform the desired reproduction, the XY-stage is moved and reproduction processing in another block region starts from Step 1. If it is impossible to perform the desired reproduction, the difference between the image (the difference between image-ia-B and image-ia-W), which is stored in the memory, and the above-described image (the difference between image-ib-B and image-ib-W) is taken and is stored in the computer PC, and the difference therebetween is further taken to attempt the reproduction. At this time, if it is possible to perform the desired reproduction, the XY-stage is moved and reproduction processing in another block region starts from Step 1. If it is impossible to perform desired reproduction, a coordinate of the XY-stage in the region in which the reproduction is attempted this time, a Z coordinate of the objective lens, and an error flag are stored in the memory inside of PC, the XY-stage is moved, and reproduction processing in another block region starts from Step 1.

Here, data imaged at an FB position, that is, a focus position at which dots appear to be dark are used in Steps 2 and 3, and data imaged at an FW position, that is, a focus position at which dots appear to be bright are used in Steps 4 and 5. However, even if data imaged at the FB position are inversely used in Steps 2 and 3 and data imaged at the FW position are inversely used in Steps 4 and 5, it is possible to perform the same reproduction.

The determination of whether or not it is possible to perform the desired reproduction in the above description may be made such that, for example, data are recorded as a code capable of detecting an error or correcting the error, and it is determined that the reproduction can be performed when there is no error or when the error can be corrected.

As described above, it is possible to obtain a high S/N ratio even with dots recorded in a transparent medium having no particular recording layer, using the example of FIG. 1.

Example 2

When the energy of a laser for recording is low, in some cases, a device, which increases the contrast, that is, the brightness and darkness difference between dots and a portion in which there is no dot as much as possible, is effective during the imaging in the example of FIG. 2. A useful example in such a case is shown in FIG. 3.

An optical system of the present example is provided between an objective lens OB-LENS and an imaging lens IM-LENS in the example of FIG. 2. The example of FIG. 2 has an arrangement of an optical system of a so-called infinity correction type microscope. Therefore, as is well known as an advantage of the infinity optical system, it is possible to set the space between the objective lens and the imaging lens to an arbitrary distance to some extent. For this reason, the arrangement is suitable for inserting an additional optical system as shown in FIG. 3 into a connection tube CONNECTOR.

Figure 3:
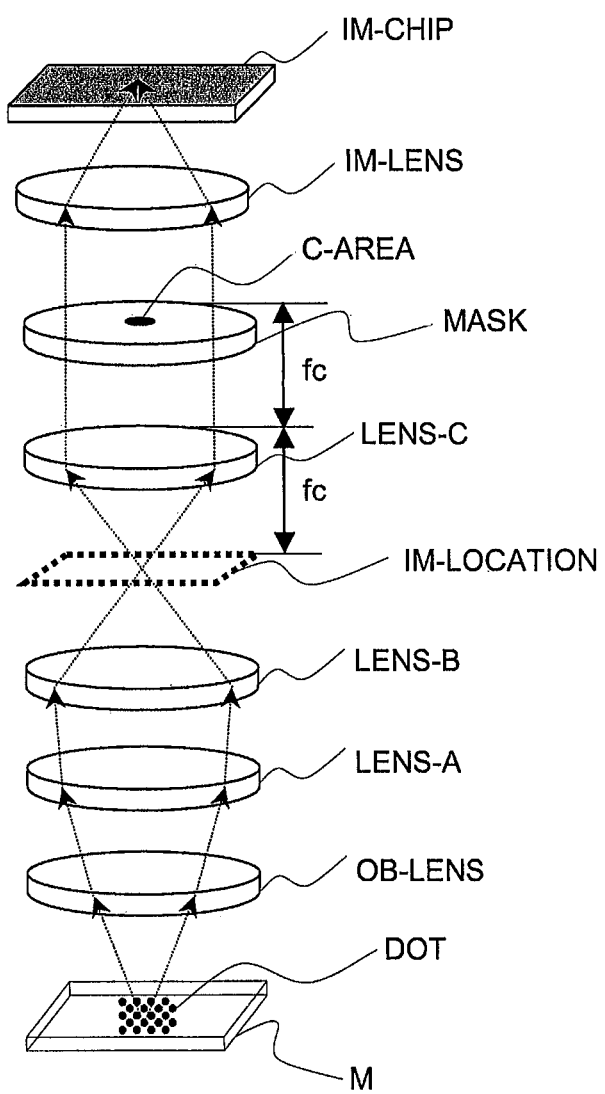
FIG. 3 is an example of an optical system for reducing or shielding a specific spatial frequency and for correcting an aberration caused by the thickness of a medium, in combination with the optical system in FIG. 2.

In FIG. 3, the optical axis of lenses LENS-A, LENS-B, and LENS-C is coincide with the optical axis of the objective lens OB-LENS or the imaging lens IM-LENS. In the drawing, a lens is drawn for each type of lenses including the objective lens and the imaging lens for easy understanding in principle. However, needless to say, a configuration of a plurality of lenses in a plurality of groups can be provided as necessary. The roles of the lenses LENS-A and LENS-B are to correct a spherical aberration generated by a recording medium, and then, to form a real image at a focal position of the lens LENS-C.

As described above, the dots DOT are formed by condensing laser light on the inside of a transparent medium M. The recording medium has higher refractive index than that of the air. Therefore, in some cases, in observation of the dots therein, clear focus cannot be obtained using an objective lens of a general industrial microscope which is designed to observe the surface of metal, or using an objective lens of a general microscope for organisms which is designed to perform observation through a thin cover glass of a prepared specimen. That is, a lay of light emitted from a point of a dot is incident on the objective lens after causing refraction due to the difference between the refractive index of the medium and the refractive index of the air on the surface of the medium.

Originally, the lay of light emitted from a point of an observation object passes through the objective lens, and then, becomes a parallel light flux between the objective lens and the imaging lens. However, the light emitted from the objective lens at a position separated from the optical axis is spread. The aberration (spherical aberration due to the medium) is corrected in the lenses LENS-A and LENS-B. That is, the above-described aberration derived from the medium is corrected by converging the lay of light emitted from the objective lens toward the peripheral portion using the lenses LENS-A and LENS-B.

If the quality of a medium is always the same, the refractive index does not change, and the depth of the dots is constant, it is possible to correct the aberration using an aspheric lens. However, in a case in which dots are recorded on a plurality of layers and the depths of the dots vary, or in a case in which the quality of the medium varies, the amount of the aberration varies. Therefore, it is effective to change the gap between plural lenses, for example, two or more lenses as shown in the present example.

A lens for correcting the above-described aberration derived from the medium or other general aberrations and for improving the quality of the actual image formed by the lens LENS-B can be designed by those having a knowledge of an optical design by applying optical characteristics of an optical illumination, the refractive index of a medium, the depth of dots, and the characteristics of an objective lens. Therefore, the detail thereof will be omitted.

The distance between LENS-C and a position IM-LOCATION of a surface of an actual image which is shown by a dotted line in the drawing and is formed by LENS-B is set to a focal distance of the lens LENS-C. Accordingly, the actual image formed by the lens LENS-B is converted into a parallel light flux, passes through a mask MASK, and is incident on the imaging lens IM-LENS.

The mask MASK is provided on the imaging lens side by the focal distance fc from the lens LENS-C. The mask MASK is a parallel flat plate made of thin transparent plate-like optical glass and is made so as to shield or to dim transmissive light only in an area AREA-C around the center.

In order to realize the means for shielding or absorbing transmissive light in a portion as described above, for example, thin metal may be deposited on the portion of AREA-C of the mask MASK. The position of the above-described mask MASK corresponds to a position of a so-called a Fourier surface in the lens LENS-C.

As described above, an actual image of an object which the objective lens observes can be formed on one focal surface of the lens LENS-C. Therefore, the information on the image in which light is shielded or dimmed in the above-described area C-AREA is a low frequency component among the above-described actual image Fourier components.

Accordingly, a spatially high frequency is emphasized in the actual image which passes through the imaging lens IM-LENS and is formed on an imaging element IM-CHIP. For this reason, even when the difference between the refractive index of the dot portion and the refractive index in the vicinity is small, the edge of the boundary of the refractive indexes is emphasized and the contrast of the dot image is improved, and thereby, the signal amount can be increased.

In FIG. 3, the optical paths from dots close to the optical axis among the dots inside the recording medium M are shown by two polygonal lines. The mask MASK may be provided on the Fourier surface of the objective lens or the imaging lens. However, in general, in the objective lens or the imaging lens, the Fourier surface tends to exist between lens groups constituting the objective lens or the imaging lens. For this reason, it is difficult to insert the mask therein. In the example of FIG. 3, an optical system forming an actual image is once inserted between the objective lens and the imaging lens and a mask is provide on the Fourier surface of the lens. Therefore, it is possible to avoid such a problem.

As described above, the objective lens and the imaging lens of FIG. 2 has an infinity correction type arrangement. Therefore, the gap between both the lenses has a large degree of freedom to some extent and the lenses are suitable for the combination with the example of FIG. 3. According to the example of FIG. 3, it is possible to correct the aberration derived from a medium and it is also possible to improve the contrast of dots.

As a result, it is possible to perform reproduction at high S/N ratio even when the number of layers of the recording dots is increased, damage of information which is recorded at a deeper position is avoided, or energy during the recording is low and change in the refractive index of dots is small. In addition, the optical system is easily combined with an objective lens or an imaging lens of a general microscope, and therefore, there is an advantage in that the reproduction device can be formed at low cost. In FIG. 3, a lens in a group is shown for the above-described lens LENS-C for simplification. However, it is natural that the reproduction device may be configured of a plurality of lenses in a plurality of groups as necessary in order to further reduce the generation of the aberration.

Example 3

Figure 4:
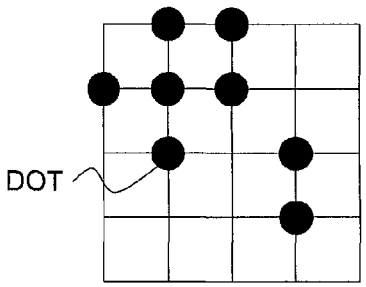
FIG. 4 is an example of a case in which the number of recording layers is increased.
Figure 4:
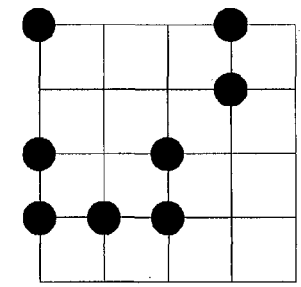
Figure 4:
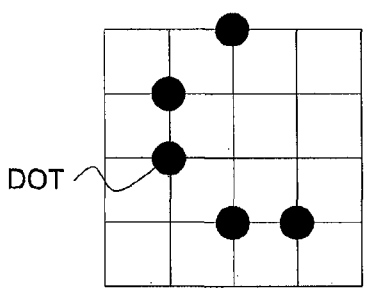
Figure 4:
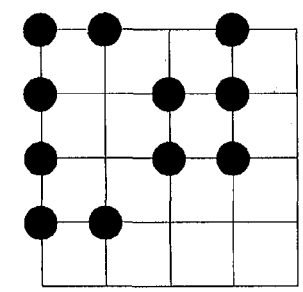
Figure 4:
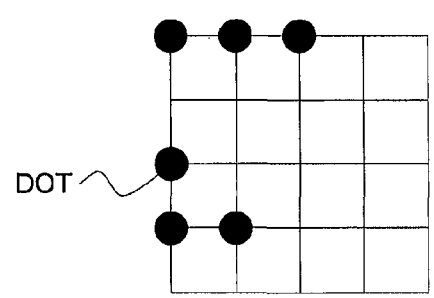
Figure 4:
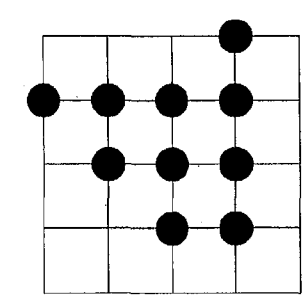

An example of FIG. 4 is an example in which the example of FIG. 1 is extended to have a plurality of layers, and n sets of sub-layers, such as LA-1, LB-1, LA-2, LB-2, . . . , LA-n, and LB-n, in total are recorded. Similarly to FIG. 1, a data matrix D corresponding to an array of 4×4 dots recorded in an XY region of a portion of each layer is also shown in the drawing for easy understanding. A dot array of the sub-layer is shown on the left side of the drawing and a corresponding data matrix Di is shown on the right side of the drawing.

A name of a layer and a Z coordinate are shown above the dot array of each layer. A Z coordinate of a LAi layer is denoted as ZAi, and the distance between the LAi layer and the LBi layer, which are a pair of sub-layers, in the Z direction is denoted as DZi. In addition, the distance between the LAi layer and the LAj layer in the Z direction is denoted as DZij and shows a distance between closest LA layers, that is, the a distance between LAi and LA(i+1) in the Z direction unless otherwise specified.

In addition, a dot pitch within a layer in the X direction is denoted as DXi and a dot pitch within a layer in the Y direction is denoted as DYi. The sizes of DXi and DYi drawn in the drawing are the same as each other. Accordingly, the density of dots in a surface in which the LAi layer and the LBi layer are combined can be maximized to $1/F^2$ as described in the description of the example of FIG. 1.

The values of the above-described DZi, DZij, DXi, and DYi may be constant irrespective of i or may be changed depending on i. For example, when there is no problem in an aberration or the like during recording or reproduction caused by the distance from a surface of a medium of a layer, it is possible to make the movement distance of an objective lens or a recording medium during the recording and the reproduction constant by making the values constant irrespective of i, and therefore, there is an advantage in that these can be easily controlled.

In contrast, when the influence of the aberration becomes greater as the depth of a medium from the surface of the medium to the layer is deeper during recording or reproduction, there is an advantage in that it is possible to increase the S/N ratio during recording and reproduction if all of the values or at least a portion of the values is made to be great depending on the depth of the layer.

The relationship between the size of DZi and the size of DZij described above may be set based on the following idea. Similarly to FIG. 1, the lower limit of the distance between the pair of layers is a focal depth of an objective lens and is substantially the same as the minimum distance between dots within the layers. However, the upper limit thereof is different from a case where there is a pair of layers. In the case where there is a pair of layers, if the distance between the pair of layers is set to be extremely long, when any one layer is focused, the influence from the other layer can be made small, and therefore, there is no particular upper limit. However, in the present example, there is an upper limit since there are plural pairs of layers.

Two pairs of layers including a pair of layers which are an LA1 layer and an LB1 layer and a pair of layers which are an LA2 layer and an LB2 layer will be described for easy understanding. It is regarded that a LA1 layer, LB1 layer, LA2 layer, and LB2 layer are recorded in order close to the surface of a medium. When the distance Z1 between the LA1 layer and the LB1 layer becomes longer while maintaining the distance DZ12 between the LA1 layer and the LA2 layer in the Z direction, the LB1 layer approaches the LA2 layer. As a result, the influence of the LA2 layer on the image focused on the LB1 layer becomes greater than the influence of the LB2 layer thereon. The dot arrangements of the adjacent pair of layers which are the LA2 layer and the LB2 layer are complementary. Thus, when the influences of both the layers are substantially the same, noise given to the image on the LB1 layer is canceled. However, when an influence of a layer is great, the noise is not canceled and the noise of the layer influences the image. To what extent the range of the distance Z1 is acceptable depends on the optical system for reproduction, the quality of recording, and the acceptable degree of the S/N ratio during reproduction. Even in a sample in which Z1 is made longer by 50% of DZij among samples produced in the invention as a trial, the S/N ratio is greater than or equal to 14 dB.

In the sample, the minimum pitch of dots within a layer is set to 4.4 µm and DZij is set to 120 µm, and DZi is set to 60 µm. The S/N ratio in the above description is defined as twenty times a logarithm to base 10 of a value obtained by dividing an average brightness and darkness difference of '1' and '0' corresponding to the signal amount by a square mean value of standard deviation corresponding to variation, that is, noise. Accordingly, the S/N ratio being 14 dB shows that the noise with respect to the signal amount is less than or equal to a fifth. From the above description, it is considered that, in general, the upper limit of DZi may be 50% of DZij in the multilayer sample.

For this reason, in the present example using the plurality of layers, it is possible to increase the S/N ratio by providing the pair of layers similarly to the example of FIG. 1. That is, in the medium M in which the plurality of layers are recorded, it is possible to increase the S/N ratio during reproduction and it is possible to reproduce data with high reliability, that is, at a lower error ratio.

The effect of the present example was checked using the trial sample, and as a result, if two layers in front and back of an attention layer were set in pair of dot arrangements which were complementary, the S/N ratio increased by a maximum of 8 dB simply using one image of the pair of layers which was being paid attention.

In addition, it was possible to further increase the S/N ratio by about 3 dB by taking a difference between an image of a layer which was being paid attention and an image of a layer that made a pair with the layer. S/N increased the most when the coefficient in the case of taking the difference decreased by about 15% of the image of the pair layer from the attention layer.

In the examples of FIGS. 1 and 4, dots are arranged in a lattice shape when the dot arrangements of the sub-layers that are an LA (LAi) layer and an LB (LBi) layer which make a pair are combined. As described above, in this case, when the minimum value of dot processing is set to F, the bit density within the surface on which the LAi layer and the LBi layer are combined becomes $1/F^2$.

Example 4

Figure 5:
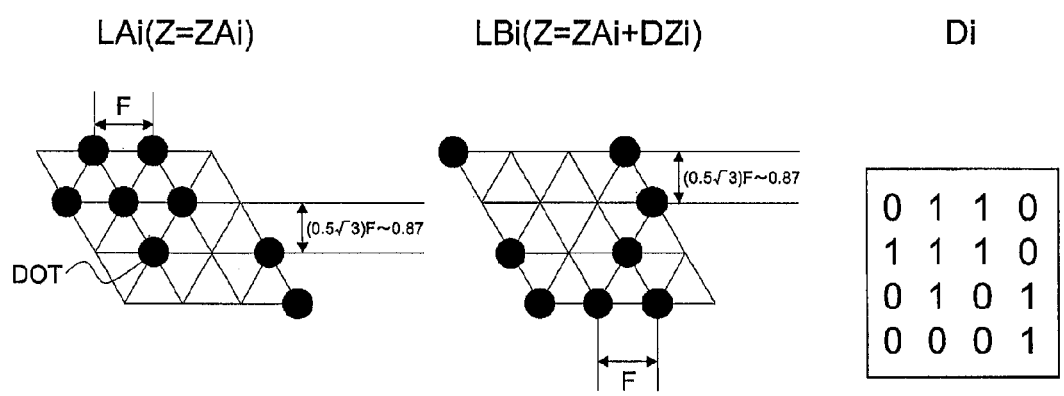
FIG. 5 is an example in which dots are arranged in an equilateral triangle shape.

In an example shown in FIG. 5, it is possible to further reduce the bit density within a layer than $1/F^2$ which is the value in the examples of FIGS. 1 and 4 while maintaining a minimum processing pitch between dots as F by slightly changing the arrangement of the dots. As shown in the drawing, the minimum gap between dots on the same row (in a horizontal direction in the drawing) is set to F and the gap between a row and an adjacent row is set to $(0.5\sqrt{3})$ F, that is, about 0.87 F.

When the dots on an LAi layer and an LBi layer in the drawing are combined, all of the dots are arranged so as to be at apexes of equilateral triangles. The area of an equilateral triangle having F as a side is $(0.25\sqrt{3})$ $F^2$ and the sum of interior angles is 180 degrees. Therefore, the occupancy area per bit becomes an area twice as large as the above-described equilateral triangle. That is, the area thereof becomes $(0.5\sqrt{3})$ $F^2$ which is about $0.866$ $F^2$, and therefore, it is possible to realize high density of about 13.4% compared to the lattice-like arrangement as shown in FIGS. 1 and 4.

Only an arrangement of a set of layers which are the LAi layer and the LBi layer is shown in FIG. 5. However, needless to say, it is possible to record only a set of layers that are the LA layer and the LB layer which makes a pair as shown in FIG. 1 and it is also possible to record n sets of layers from LA1 and LB1 to LAn and LBn as shown in FIG. 4 to increase the recording capacity. The same principle applies to the effect of improving the reliability as described above in each case.

In a case in which the example of FIG. 4 or the example of FIG. 5 is made to have a plurality of layers, if the sub-layers which make a pair are combined as described above, all of the dots are uniformly arranged at a minimum pitch. Therefore, there is an advantage in that substantially uniform noise is superimposed on a dot position on an attention layer which is focused, and as a result, it is possible to reduce interlayer crosstalk.

Example 5

However, when the gap DZij between layers is made small for the purpose of increasing the volume density, in some cases, the noise from a sub-layer which is being paid attention cannot be uniformly ignored. In such a case, an example shown in FIG. 6 is effective.

Figure 6:
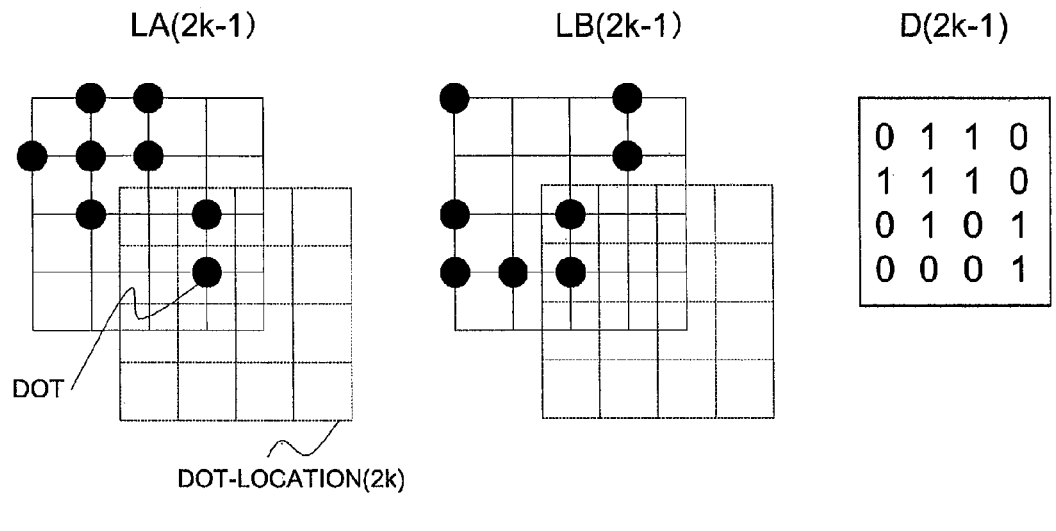
FIG. 6 is an example of the present invention in which dots are prevented from overlapping with adjacent sub-layers.
Figure 6:
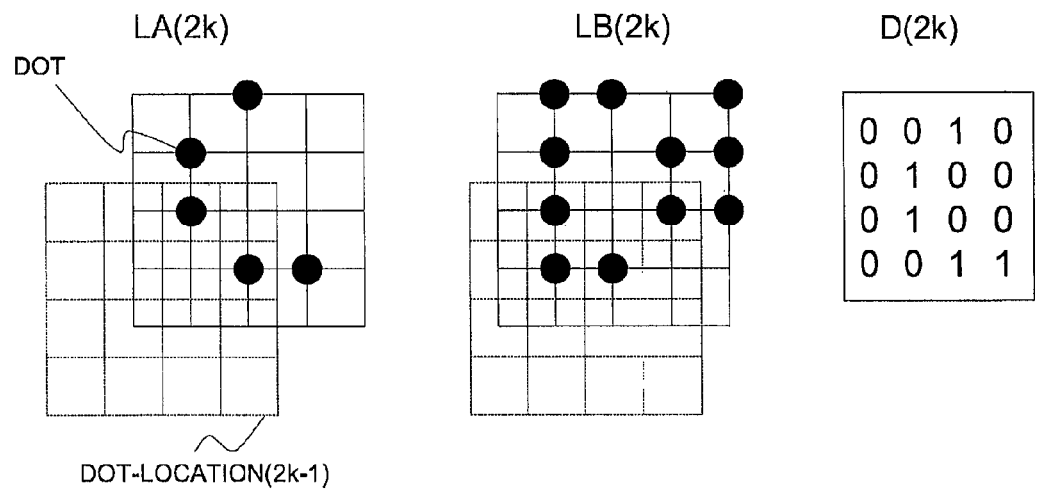

FIG. 6 shows dot arrangements of each sub-layer and recorded data matrices on a (2k−1) layer which is an odd-numbered layer and a (2k) layer which is an even-numbered layer among a plurality of layers. Also in the drawing, similarly to FIG. 4, only an arrangement of 4×4 dots is shown.

Also in the present example, similarly to the example of FIG. 4, the dot arrangements of the sub-layers making pairs which are LA(2k−1) and LB(2k−1) layers or LA(2k) and LB(2k) layers correspond to '1' and '0'. For this reason, there are advantages that the signal amount is increased and crosstalk noise is offset, which are the advantages of example of FIG. 4. The difference from FIG. 4 is that the position of a lattice point at which dots on the odd-numbered layer are arranged and the position of a lattice point at which dots on the even-numbered layer are arranged are deviated as shown by dotted lines as auxiliary lines in the drawing of the dot arrangements.

For this reason, when the attention layer is focused, a blurred image of dots on layers in front and back of the attention layer overlaps a blank portion between the dots on the attention layer, and therefore, it is expected that the crosstalk to a focus image of dots on the attention layer will further decrease. As a result, it is possible to reduce the interlayer distance DZij compared to the example of FIG. 4. Therefore, it is possible to reduce the thickness and the area of the medium for recording the same amount of data since the volume density increases. Alternately, it is possible to record more data in a recording medium having the same volume.

Example 6

Figure 7:
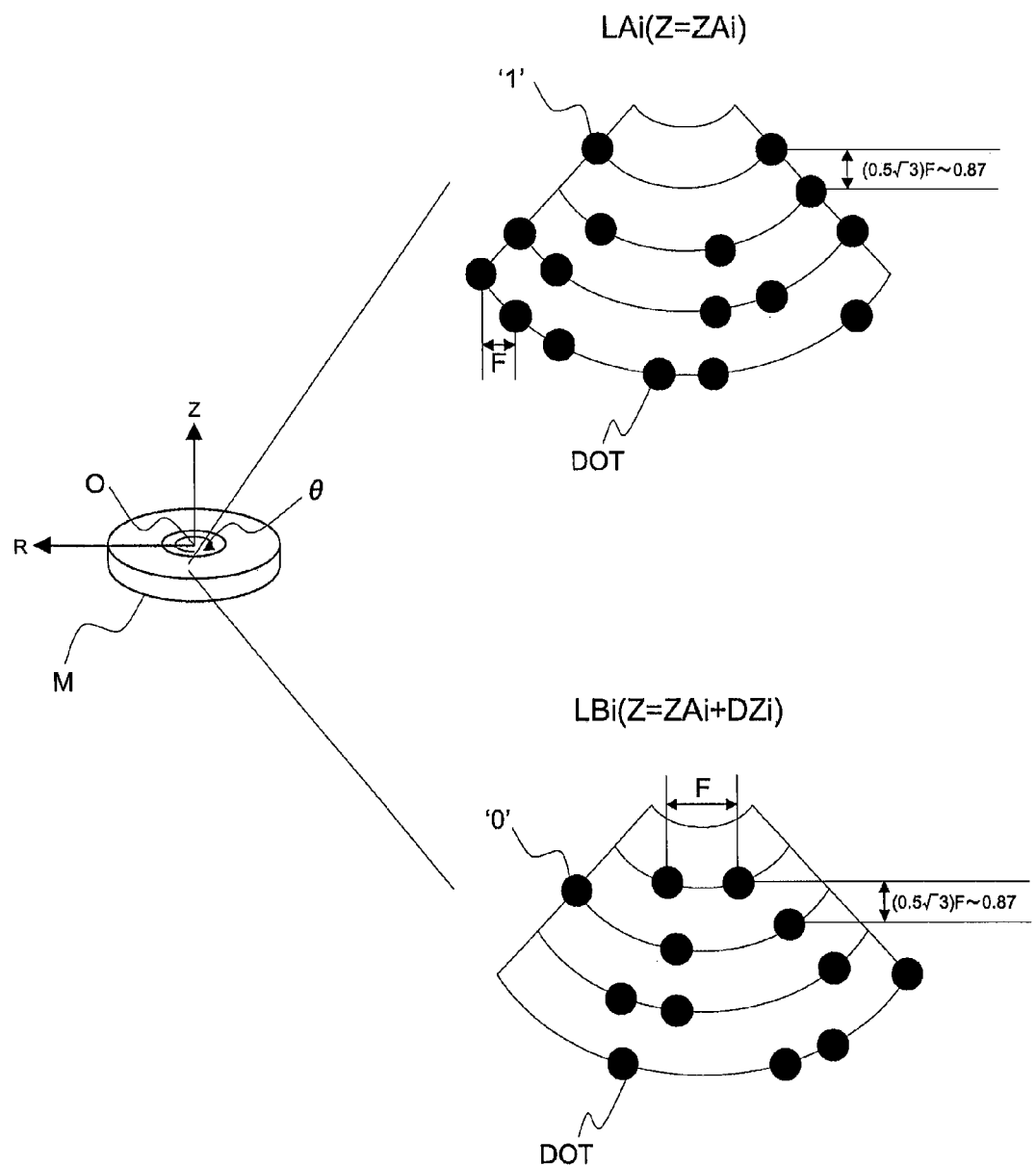
FIG. 7 is an example in which dots are arranged in concentric circles.
Figure 8:
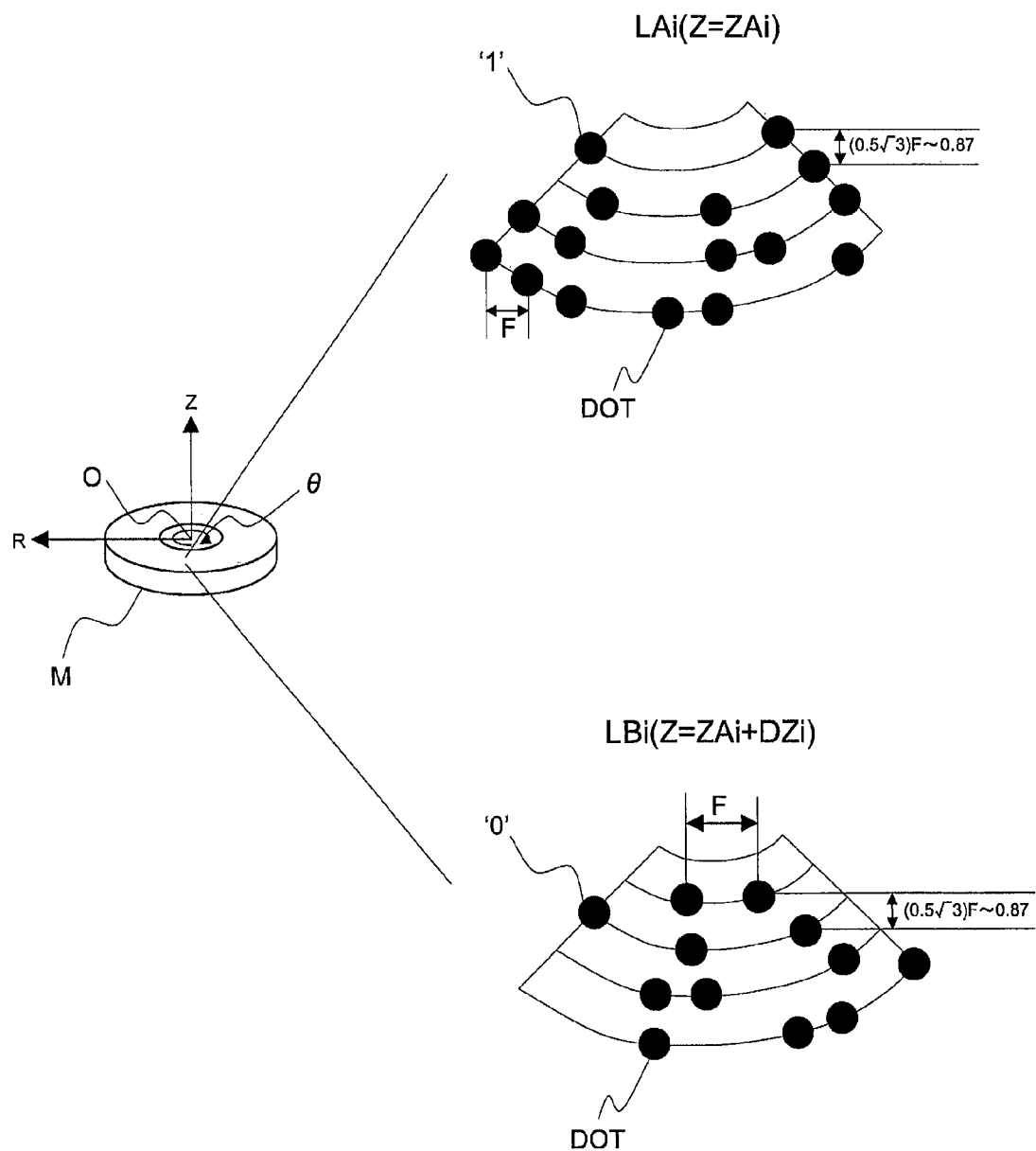
FIG. 8 is an example in which dots are arranged in a spiral shape.

In FIG. 6, the example relating to the lattice-like arrangement as in FIG. 4 is shown, and similarly, other various arrangements, for example, the equilateral triangle-like arrangement as shown in FIG. 5, and a case in which dots are arranged in a curved-line shape as shown in FIGS. 7 and 8 to be described later can also be applied. The effect of improving the volume density can be expected from these arrangements.

FIGS. 7 and 8 are examples of a case in which dots are arrayed in a curved-line shape instead of a linear shape in the example of FIG. 4. These are examples suitable for a case in which dots are recorded while rotating a medium. In the example of FIG. 7, the dots within a layer are arranged in a concentric shape. Only a portion of four concentric circles is enlarged and shown in FIG. 7 for easy understanding. As shown in the drawing, the medium has a doughnut shape having a small hole in the center similarly to the optical disk in the related art. In addition, the small hole in the center can be used for fixing the medium when rotating the medium during recording or reproduction.

In FIGS. 7 and 8, only an arrangement of a set of layers which are an LAi layer and an LBi layer is shown. However, needless to say, it is possible to record only a set of the LA layer and the LB layer which become a pair as shown in FIG. 1. Moreover, it is also possible to increase the recording capacity by recording n sets of layers from LA1 and LB1 to LAn and LBn as shown in FIG. 4, or to deviate the position of the lattice point at which the dots on the odd-numbered layer are arranged and the position of the lattice point at which the dots on the even-numbered layer are arranged, as shown in FIG. 6. Moreover, the same principle applies to the effect of improving the reliability or improving the volume density as described above in each case.

As is described so far, it is possible to expect two effects of increasing a reproduction signal from one layer and of reducing crosstalk from adjacent layers by configuring one recording layer with a set of two adjacent sub-layers LAi and LBi and by configuring dots on any one layer so as to correspond to data '1' to be recorded and configuring dots on the other layer so as to correspond to '0'.

In this case, a layer is configured of two sub-layers, and therefore, when manufacturing a large amount of recording media, for example, it is considered that there is a possibility that the recording time being increased may be a problem. In this case, it is possible to consider measures in which sub-layers are separated for each total number k (where k is a natural number greater than or equal to 2) in which interlayer crosstalk is acceptable without separating all the layers in two sub-layers; the interlayer distance is increased by inserting a layer, on which recording is not performed, for each k layer; or a layer on which dots are most densely concentrated is provided for each k layer as will be described later.

When it is not necessary that the gap between the dots within a layer be filled with dots, it is acceptable even if the blurring amount due to a spherical aberration or the like caused by the depths of dots from the surface of the medium during recording or reproduction is increased to some extent. Therefore, it is effective to sufficiently increase the interlayer distance using a deep portion of the medium without merely separating all of the layers into the sub-layers.

In any case, the number of dots being recorded with respect to the same amount of data decreases compared to the case of separating all of the layers into two sub-layers, and therefore, it is effective in shortening the recording time. However, in the layer which is not separated into the sub-layer, only a signal from any one of '1' and '0' can be used. Therefore, even if the interlayer crosstalk noise is acceptable, in some cases, the signal amount is insufficient.

In such a case, as described above, it is effective to increase the signal amount using the fact that there is an FB position, that is, a focus position at which a dot portion appears to be darker (black) compared to the vicinity, and an FW position, that is, a focus position at which dots appear to be brighter (white) than the vicinity when the objective lens is focused on the vicinity of the attention layer inside the medium and the focus is moved forward and backward, in the example of the reproduction device of FIG. 2 or the reproduction device in which FIGS. 2 and 3 are combined.

That is, an image of a dot pattern on the attention layer is imaged at the FB position, that is, a focus position at which the dots appear to be dark, and the image data are stored in a memory inside the computer PC. Consequently, an image of a dot pattern on the attention layer is imaged at the FW position, that is, a focus position at which the dots appear to be brighter, and the image data are stored in a memory inside the computer PC.

It is possible to increase the signal amount to some extent even if the layers are not separated into the sub-layers by reading two image data pieces which have been obtained in this manner, from the above-described memory and by calculating the difference using the computer PC.

Example 7

Figure 9:
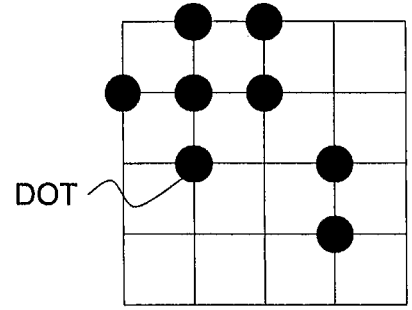
FIG. 9 is an example having a layer of which a front surface is minutely formed with dots.
Figure 9:
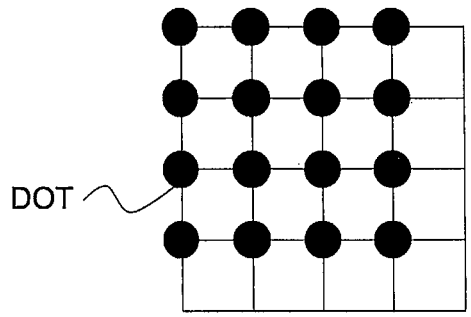
Figure 9:
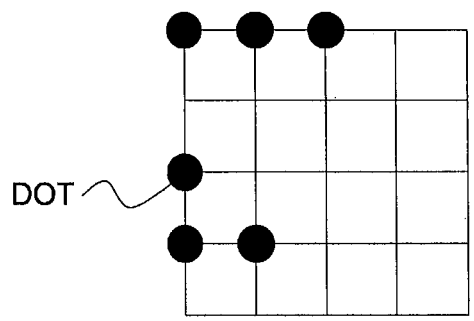

Among the above-described measures, an example in which a layer on which dots are most densely concentrated is provided for each of a plurality of layers will be described using FIG. 9. In FIG. 9, LAi (where i is a natural number)

is a layer on which dots are recorded only in a location corresponding to '1' among the data matrix Di.

In the present example, an LCi layer is provided for every appropriate number of layers instead of providing a sub-layer which makes a pair with the LAi layer. In the LCi layer, the dots are recorded by regarding all of the data as '1'. The layer is not a layer for recording data, but is a layer for reducing crosstalk without using the sub-layer. Crosstalk noise generated from the LCi layer has a spatial frequency equivalent to a minimum pitch of dots.

Accordingly, when observing a layer close to an objective lens adjacent to the LCi layer, crosstalk noise from the LCi layer and a plurality of layers closer to illumination than the LCi layer has a strongest spatial frequency component equivalent to the minimum pitch of dots. For this reason, the crosstalk noise becomes substantially uniform in an observation layer.

Furthermore, when observing a layer close to the objective lens, crosstalk noise from a data layer between the layer close to the objective lens and the LCi layer is superimposed. However, when the total number thereof is small, crosstalk noise is reduced compared to the case in which there is no LCi layer. Accordingly, it is expected that it is possible to suppress the crosstalk noise to a value less than or equal to an acceptable value by providing the LCi layer for every appropriate number of layers.

In this manner, according to the example of FIG. 9, it is possible to reduce the crosstalk noise to some extent while maintaining the number of dots being recorded smaller compared to the case where all of the layers are separated into two sub-layers.

In the present example, a case in which dots are recorded only in a location corresponding to '1' among the data matrix Di in the LAi layer has been described. However, the same effect is exhibited even if dots are recorded only in a location corresponding to '0' and dots are recorded by regarding all of data as '0' in the LCi layer.

Hereinabove, in a recording medium recording data using minute modified regions which are formed by condensing and radiating a short pulse laser on the inside of glasses such as silica glass, or alumina, transparent ceramics or plastics, or the like, the example for providing high S/N ratio during reproduction have been described.

In the present invention, as shown in the example of FIG. 2, data are read out using shade of image photographed using a camera having an imaging element therein. For this reason, it is necessary to photograph an enlarged image of an attention layer using the optical system of FIG. 2 and the optical system in which FIGS. 2 and 3 are combined.

As described above, based on the sampling theorem, a minimum pitch in an actual image of dots within a layer which can be formed on an imaging element needs to be twice as large as the pitch between pixels constituting the imaging element or greater. However, this is about an ideal case, and in a case in which a general color camera or the like is used, one pixel is configured of 4 pixels. Therefore, a minimum magnification ratio needs to become larger.

It is desirable that the above-described ratio be at least 4 times or more, and if possible, be about 10 times depending on variation in recording positions of dots, crosstalk noise, an aberration of an optical system, the inclination of a recording layer and an optical axis, and the like. For example, if it is regarded that the dot pitch is 2 μm and the pixel pitch is 4 μm, a required magnification ratio becomes 20 times.

The area of a sample which can be imaged at a time is an area which is obtained by dividing the area of an imaging element by the magnification ratio. For example, when the imaging element is regarded as 12×6 mm, it is possible to photograph an area of 600 μm×300 μm at a time at 20 times of the magnification ratio. Since this area is a portion of a recording medium, dots (hereinafter, referred to as alignment marks) which become marks for each constant area in recorded dots are effective for alignment of an imaging visual field.

In addition, when a photographing region of a medium is moved, the conditions such as the quality of recording and the like changes, and therefore, it is also necessary to optimize the conditions of determining whether the recorded bit is '1' or '0' from the shade of an obtained image. For this reason, it is effective to record test data from which a correct answer can be found within a layer at a constant interval in addition to recording data.

Example 8

Figure 10:
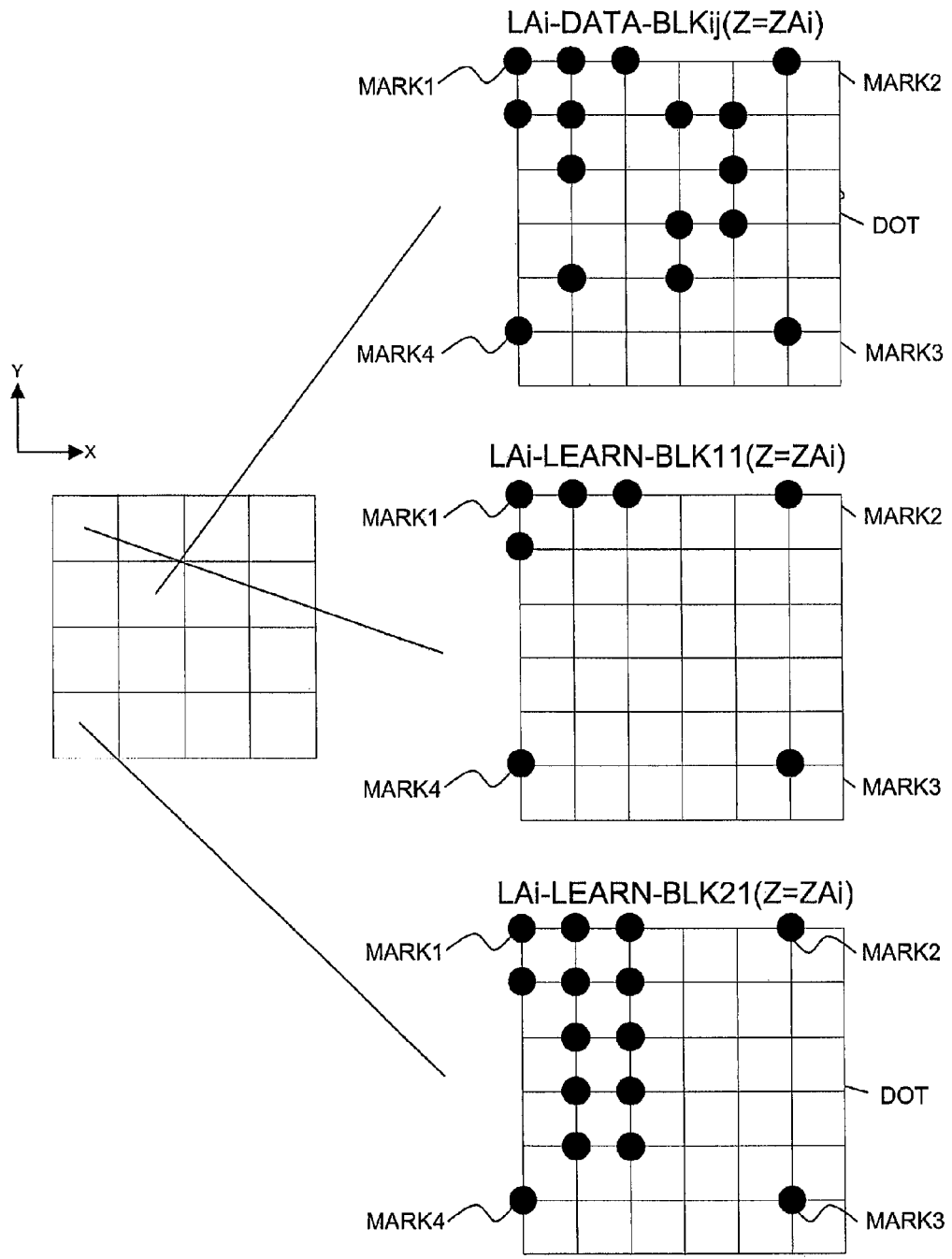
FIG. 10 is an example in which dots on an identical layer are divided in blocks, alignment marks are provided per block, and blocks having a dot arrangement for a test are added thereto.

The present example is an example in which alignment marks are provided in an outer edge portion of the dots in which user data is recorded. An example of a dot arrangement including the alignment marks and test patterns is shown in FIG. 10. In FIG. 10, a dot array having a lattice shape shown in FIG. 1 or 4 is taken as an example. However, it is possible to easily realize the same effect even with a dot array having a concentric circle shape or a spiral shape as shown in FIG. 7 or 8.

In FIG. 10, an example of dividing a whole layer into 4×4 blocks being 16 blocks and recording 4×4 bits in one block. Here, the number of blocks and the number of bits around a block are made to be small for easy understanding. However, as a matter of course, the present example is not limited to the numbers thereof. For example, it is possible to increase the number of blocks around a layer to 128×128 blocks and the number of bits around a block to 64×64, or the like.

The size thereof may be appropriately designed by considering a pixel pitch of an imaging element, the number of pixels of an element, the imaging magnification, a dot pitch, the size of a recording medium, and the like. Only a dot arrangement of an LAi layer is shown in FIG. 10 in relation to a space. However, when providing an LBi layer as a sub-layer, a reversed pattern thereof may be recorded at a position which is changed by ΔZi in the Z direction, that is, in a depth direction of the medium.

As described above, FIG. 10 is the example having 16 blocks. Among these, 12 blocks at the outermost periphery are the above-described test patterns and the 2×2 blocks in the central portion are data blocks in which data are recorded. Dot arrays of three blocks are shown in the drawing. The block LAi-DATA-BLKij is a data block. Dots MARK1 to MARK4 at four corners of a dot arrangement of the block are alignment marks for the above-described alignment. These marks are isolated, and thus, are easily identified from the data portion. During imaging, it is possible to adjust the position of a medium within a photographing visual field by detecting these marks.

In addition, when extracting data from the imaged image, an XY coordinate of these marks can also be used for calculating an XY coordinate at a position, at which dots in a data portion may exist, by calculating the position of an block image on an imaging element, a rotation angle, the relationship between the pitch of a dot image and the pixel pitch of the imaging element and the like. As shown in the drawing, in the upper left alignment mark MARK1, two auxiliary dots are formed on the right side and an auxiliary dot is formed on the lower side, and therefore, the alignment mark MARK1 can be easily discriminated from other alignment marks MARK2 to MARK4. When the imaging is performed in a direction such that two auxiliary dots can be seen on the right side of MARK1 which is on the upper left side, it is possible to discriminate the front/rear of the medium or to discriminate whether or not the medium is rotated by 90 degrees.

Only alignment marks of blocks of an LAi layer is shown in the drawing. Alignment marks provided in blocks of an LBi layer may be made to be in an inversion relation with that on the LAi layer, or may be the same as that on the LAi layer. Alternately, the alignment marks may be provided only on the LAi layer. In a case in which the alignment marks provided in the blocks of the LBi layer is made to have a dot arrangement in the inversion relation with the alignment marks of the blocks of the LAi layer, there is an advantage in that a pattern of the blocks of the LBi layer can be simply created by recording dots in a portion in which there are no dots on the LAi layer. Moreover, there is another advantage in that the influence of crosstalk noise generated from an alignment mark portion can be canceled if the alignment marks on the LBi layer is also in the inversion relation therewith.

In a case in which the alignment marks of the blocks of the LAi layer is made the same as the alignment marks of the blocks of the LBi layer, the method of detecting the alignment marks from an image can be made common between the blocks of the LAi layer and the blocks of the LBi layer. Therefore, there is an advantage in that the layers rarely have a difference in detection accuracy or the like. In addition, in a case in which the positions of the blocks of the LAi layer and the LBi layer directly under the LAi layer in the XY direction can be sufficiently controlled at high accuracy during recording, the alignment marks are provided only in the blocks of the LAi layer, and therefore, it is unnecessary to detect the alignment marks in the blocks of the LBi layer. Thus, there is an advantage in that the reproduction speed increases to that extent.

The example having small number of dots constituting the blocks is shown in FIG. 10 in order to simplify the description as described above. However, when the blocks are made large, for example, 64×64 dots as described above, as a matter of course, it is possible to appropriately increase the number of dots constituting the alignment marks.

In such a case, it is possible to accurately detect the change of the position or the pitch of dots in four corners in a block. In addition, in a case in which the shape of the alignment mark is made in a rectangle shape or in other shapes, or the accuracy of recording is high and the variation in the position of dots is small, it is possible to have various variations, for example, providing alignment marks only in a portion of four sides of a block instead of providing the alignment marks in all of the four sides thereof. In a case in which the alignment marks are provided only in partial sides, it is possible to avoid the alignment marks in both adjacent blocks from being arranged therebetween. Therefore, the distance between the blocks can be made small to that extent. As a result, this configuration is effective in improving substantial recording density.

Among the dot arrangements of the three blocks shown in the drawing, the two blocks on the lower side are blocks for a test. LAi-LEARN-BLK11 on the upper left side is a blank pattern and LAi-LEARN-BLK21 is a test pattern in which dots are arranged in two rows on the left side in the 4×4 dot region and two rows on the right side therein are blank. It is convenient if these test patterns are prepared such that the two-dimensional spatial frequency in the XY direction is variously changed.

In this manner, in the simple test patterns, it is possible to easily analogize dot patterns which are recorded. Therefore, it is possible to perform image processing so as to increase the high S/N ratio in these test patterns or to adjust the parameter during sampling. Particularly, it is effective to determine the setting of a threshold value, which discriminates whether an analog value obtained by the sampling is '1' or '0', from the result of these test patterns.

Example 9

FIG. 11 shows an example of a sequence when reproducing data recorded as shown in FIG. 10 using the reproduction device of FIG. 2 or the reproduction device in which FIGS. 2 and 3 are combined. Hereinafter, the sequence of reproducing data will be shown using the drawing.

Hereinafter, a method of using the alignment marks or the test patterns in FIG. 10 will be described using FIG. 11 by taking Step 2 in the flow of reproduction shown in FIG. 2 as an example.

In Step 2 described above, reproduction is attempted by imaging an image on the LA layer at the FB position. The same process as that in Step 2 can also be performed from Step 3, and therefore, the description thereof will be omitted.

It is assumed that the image for flat processing and the image for dark processing in Step 0 have been acquired through the above-described method. Heat noise is removed from a flat image by subtracting a dark image therefrom. The blank pattern LAi-LEARN-BLK11 can be used for acquiring the flat image.

An image at a FB position of a block LAi-DATA-BLKij, which is a data block, that is, a focal position at which dots are photographed darkly is acquired in Step 2. However, before acquiring the image, first, binarized threshold values or the like are obtained using blocks for a test which is in the vicinity of the data block. An image is imaged by introducing the test pattern LAi-LEARN-BLK21 into a visual field and by focusing the objective lens on the FB position. Noise is reduced by imaging a plurality of images and by taking an addition average, as necessary.

Next, heat noise is removed and an influence of variation in sensitivity of pixels of illumination or an imaging element is removed, by subtracting a dark image from the obtained image and dividing the resultant by a flat image. Then, the dots MARK1 to MARK4 at four corners of a dot arrangement of the test block are detected, and a dot pitch on the image is calculated by calculating the coordinate on the image.

Next, sampling of a shading value of the image is performed using the calculated dot pitch. If the camera used for imaging is a monochromatic camera at an 8-bit gradation, the sampling value becomes a value of any one of 256 grades from 0 to 255. Here, the above-described S/N value is calculated from the sampling value in the dot portion and the sampling value of the blank portion.

Next, the sampling value is binarized using a plurality of threshold values, and the threshold values, with which the data of the test patterns can be correctly reproduced, are obtained. LAi-LEARN-BLK21 is a test pattern in which dots are arranged in two rows on the left side in the 4×4 dot region and two rows on the right side therein are blank. Accordingly, if the binarization is correctly performed by imaging an image at the FB position, the two rows on the left side are supposed to be black and the two rows on the right side are supposed to be white. The same reproduction processing is performed also for other test patterns to confirm that the binarization is correctly performed. If the binarization is not properly performed in all of the test patterns, the threshold values are determined by removing a test pattern having an extremely low S/N ratio by several decibels (dB).

Reproduction of data blocks starts after the above-described test reproduction is finished. An image is imaged by introducing a data block LAi-DATA-BLKij into a visual field and by focusing the objective lens on the FB position. Noise is reduced by imaging a plurality of images and by taking an addition average, as necessary.

Next, heat noise is removed and an influence of variation in sensitivity of pixels of illumination or an imaging element is removed, by subtracting a dark image from the obtained image and dividing the resultant by a flat image. Then, the dots MARK1 to MARK4 at four corners of a dot arrangement of the data block are detected, and a dot pitch on the image is calculated by calculating the coordinate on the image.

Next, sampling of a shading value of the image is performed using the calculated dot pitch, binarization is performed using the threshold values obtained during the test reproduction, and digital data of '1' and '0' are played back based thereon. Whether or not an error can be corrected is checked. If the error can be corrected, the process proceeds to reproducing of a next data block. If the error cannot be corrected, the reproduction in Step 3 is performed on the identical data block.

In this manner, according to the example of FIG. 10, it is possible to determine the threshold values using a test block adjacent to a data block to be played back, and therefore, it is possible to perform reproduction with high reliability.

In the above description, if the sampling is performed at a constant interval using the dot pitch calculated using the alignment marks while performing the sampling of a shading value of an image, in some cases, the S/N ratio does not increase due to variation in position for each dot during recording or variation in shade inside a dot image caused by variation in the shape of dots; the difference in the gap between a dot image in the central portion of a visual field and a dot image in the vicinity thereof due to the influence of the aberration of the optical system photographing an image for reproduction; or the like. In such a case, it is effective to determine the sampling value by referring to not only the values of pixels which are the most adjacent to the calculated sampling position, but also to the values of pixels in the vicinity thereof. To what extent the pixels are appropriately used varies due to the above-described variations. For example, a pixel at a distance not longer than the half of the calculated dot pitch around the pixels most adjacent to the calculated sampling position may be referred to.

There was an effect in an evaluation example using the trial sample of the invention using a method to be described hereinafter.

A medium in this case was silica glass and the magnification of the optical system used for observation was 20. It was considered that the numerical aperture of an objective lens was about 0.6 while there is no indication. A one-layer sample which had about 30 μm of a length of dots in the Z direction and 2.8 μm of a dot pitch within a layer, and in which the dots were arranged in a lattice shape was used.

In addition, the camera used for imaging was a color camera at an 8-bit gradation and the pitch of pixels of an imaging element of the camera was 3.9 μm. The pitch of an image of dots on the imaging element corresponded to about 14 pixel pitch. A minimum value of pixels within a rectangular range (9×9 pixels) of plus/minus 4 pixels around the calculated sampling position was employed as a sampling value at the FB position under the above-described conditions. As a result, the S/N ratio increased by about 3 dB compared to the case in which the sampling was performed at a constant interval. In addition, the dots appeared to be bright at the FW position, and thus, a maximum value was employed. As a result, there was an improvement of 2.5 dB.

In the above-described evaluation, the minimum value or the maximum value was not taken from the entire region of 9×9 pixels determining the sampling value, in order to the influence of variation in the shading value for each pixel. The above-described region is divided into a plurality of small regions (3×3 pixels), average values in the divided small regions are taken, and then, minimum values or maximum values thereof were obtained. In some cases, a better result can be obtained by employing the maximum value or the minimum value of the entire region as a sampling value, or simply employing an average value as a sampling value. As to which range and method are most suitable can be determined by calculating the S/N ratio or the error ratio using the test block.

According to the present invention, it is possible to seal and store data in a firm recording medium. Therefore, the present invention is suitable for storing valuable movie or data relating to documents or cultural properties as digital data over a very long period of time.

Hereinabove, the invention made by the present inventors was specifically described based on the embodiment. However, the present invention is not limited to the embodiment, and needless to say, the invention can be variously modified or devised within a range not departing from the gist thereof.

The information recording device according to the present invention enables an improvement in recording density by arranging memory cells three-dimensionally. In addition, a recording region MA is sealed inside the recording medium M which is solid matter, and therefore, it is possible to robustly store information over a long period of time.

As described above, the present invention can be used for, for example, storing images, sound, or text data relating to official documents or cultural properties which are necessary to be stored over a long period of time, and storing genetic information of rare organisms which would become extinct, to be transmitted to posterity.

If metadata including date and time of creation, a title showing the recorded content, a writer, a readout method, and the like are added to the recording medium in the present invention, the information relating to the recorded content can be seen even if a long period of time has elapsed after the creation, which is convenient. As a matter of course, the metadata may be written in the recording medium in a format which can be read out through the above-described method of the example, or may be recorded by a character pattern or shape which can be easily discriminated and understood.

Since the present invention is particularly effective for the problem while recording data in a transparent medium, such point was mainly described in the above-described example. However, needless to say, even in a case of applying the present invention to other recording media such as a recording medium having an exclusive recording layer, the present invention is effective to increase S/N during reproduction.

REFERENCE SIGNS LIST

M: Medium, LA: A layer, LB: B layer, LAi: i-th A layer, LBi: i-th B layer, IL: Illumination device configured of light source and optical system, XY-STAGE: Y-stage, OB-LENZ: Objective lens, IM-LENS: Imaging lens, CONNECTOR: Connection tube incorporating focus adjustment mechanism, CAMERA: Camera

The invention claimed is:

1. An optical recording medium in which information is recorded therein in a three-dimensional formation of a plurality of dots and played back by radiating light therein,
   wherein one recording layer of the optical recording medium is formed of adjacent first and second sub-layers,
   wherein data '1' is recorded by the dots of the first sub-layer,
   wherein data '0' is recorded by the dots of the second sub-layer, and
   wherein one of the data '1' is recorded in the first sub-layer or the data '0' is recorded in the second sub-layer at each of a plurality of same positions with respect to a normal line of the optical recording medium.

2. The optical recording medium according to claim 1, wherein there are a plurality of the recording layers, and wherein each of the respective recording layers has first and second sub-layers where one of the data '1' is recorded in the first sub-layer or the data '0' is recorded in the second sub-layer at each of a plurality of same positions with respect to the normal line of the optical recording medium.

3. The optical recording medium according to claim 2, wherein a position of a lattice point at which the dots on an odd-numbered layer among the plurality of recording layers are arranged and a position of a lattice point at which the dots on an even-numbered layer among the plurality of recording layers are arranged are deviated.

4. The optical recording medium according to claim 1, wherein the dots are arranged in a lattice shape on planes of the first and second sub-layers.

5. The optical recording medium according to claim 1, wherein the dots are arranged in a curved-line shape on planes of the first and second sub-layers.

6. The optical recording medium according to claim 1, wherein at least any one of the first and second sub-layers is provided with an alignment mark in an outer edge portion of the dots in which user data is recorded.

7. A method of reproducing information from an optical recording medium, comprising:
   radiating light in the optical recording medium which has at least one recording layer in which a plurality of dots are three-dimensionally formed therein, and the one recording layer is formed of adjacent first and second sub-layers, where data '1' is recorded by the dots of the first sub-layer, and data '0' is recorded by the dots of the second sub-layer; and
   reproducing the information recorded in the recording layer from a signal which is obtained by irradiating the optical recording medium with the light,
   wherein one of the data '1' is recorded in the first sub-layer or the data '0' is recorded in the second sub-layer at each of a plurality of same positions with respect to a normal line of the optical recording medium.

8. The method according to claim 7,
   wherein the light radiated in the optical recording medium passes through an objective lens and reaches a detector, and
   wherein an interlayer distance between the first sub-layer and the second sub-layer is longer than or equal to a focal depth of the objective lens.

9. The method according to claim 7,
   wherein the interlayer distance between the first sub-layer and the second sub-layer is substantially the same as a difference between a focus position at which a dot portion appears to be darker than the vicinity by the light irradiation and a focus position at which a dot portion appears to be brighter than the vicinity by the light irradiation.

10. The method according to claim 7, further comprising:
    taking a difference between an image in a focus position at which a dot portion appears to be darker than the vicinity by the light irradiation and an image in a focus position at which a dot portion appears to be brighter than the vicinity by the light irradiation, with respect to the first sub-layer, and creating the difference as an image in the first sub-layer;
    taking a difference between an image in a focus position at which a dot portion appears to be darker than the vicinity by the light irradiation and an image in a focus position at which a dot portion appears to be brighter than the vicinity by the light irradiation, with respect to the second sub-layer, and creating the difference as an image in the second sub-layer; and
    reproducing information using the image in the first sub-layer and the image in the second sub-layer.

11. The method according to claim 7,
    wherein the light radiated in the optical recording medium reaches a detector through a mask lens for shielding or dimming a predetermined frequency component among actual image Fourier components.

12. The method according to claim 7, further comprising:
    a first step of imaging any one of an image in a focus position at which a dot portion appears to be darker than the vicinity by the light irradiation and an image in a focus position at which a dot portion appears to be brighter than the vicinity by the light irradiation, with respect to the first sub-layer;
    a second step of imaging any one image selected from the first sub-layer with respect to the second sub-layer if it is impossible to perform reproduction in the first step;
    a third step of creating a differential image between the image imaged in the first step and the image imaged in the second step, and performing reproduction processing;
    a fourth step of imaging another image which is not selected in the first step with respect to the first sub-layer if it is impossible to perform reproduction in the third step;
    a fifth step of creating a differential image between the image imaged in the first step and the image imaged in the fourth step, and performing reproduction processing;
    a sixth step of creating a differential image between the image imaged in the second step and the image imaged in the fourth step, and performing reproduction processing if it is impossible to perform reproduction in the fifth step;
    a seventh step of imaging another image which is not selected in the first step with respect to the second sub-layer if it is impossible to perform reproduction in the sixth step;

an eighth step of creating a differential image between the image imaged in the seventh step and the image imaged in the second step, and performing reproduction processing; and a ninth step of creating a differential image between the differential image between the image imaged in the first step and the image imaged in the fourth step and the differential image between the image imaged in the second step and the image imaged in the seventh step, and performing reproduction processing if it is impossible to perform reproduction in the eighth step.

13. The method according to claim 7, further comprising:

a step of performing test reproduction through which a threshold value for binarizing into the data '1' or '0' is obtained, wherein the reproduction is performed by the binarization based on the threshold value.

* * * * *